INVENTOR
F. M. PEARSALL
BY
P. C. Smith
ATTORNEY

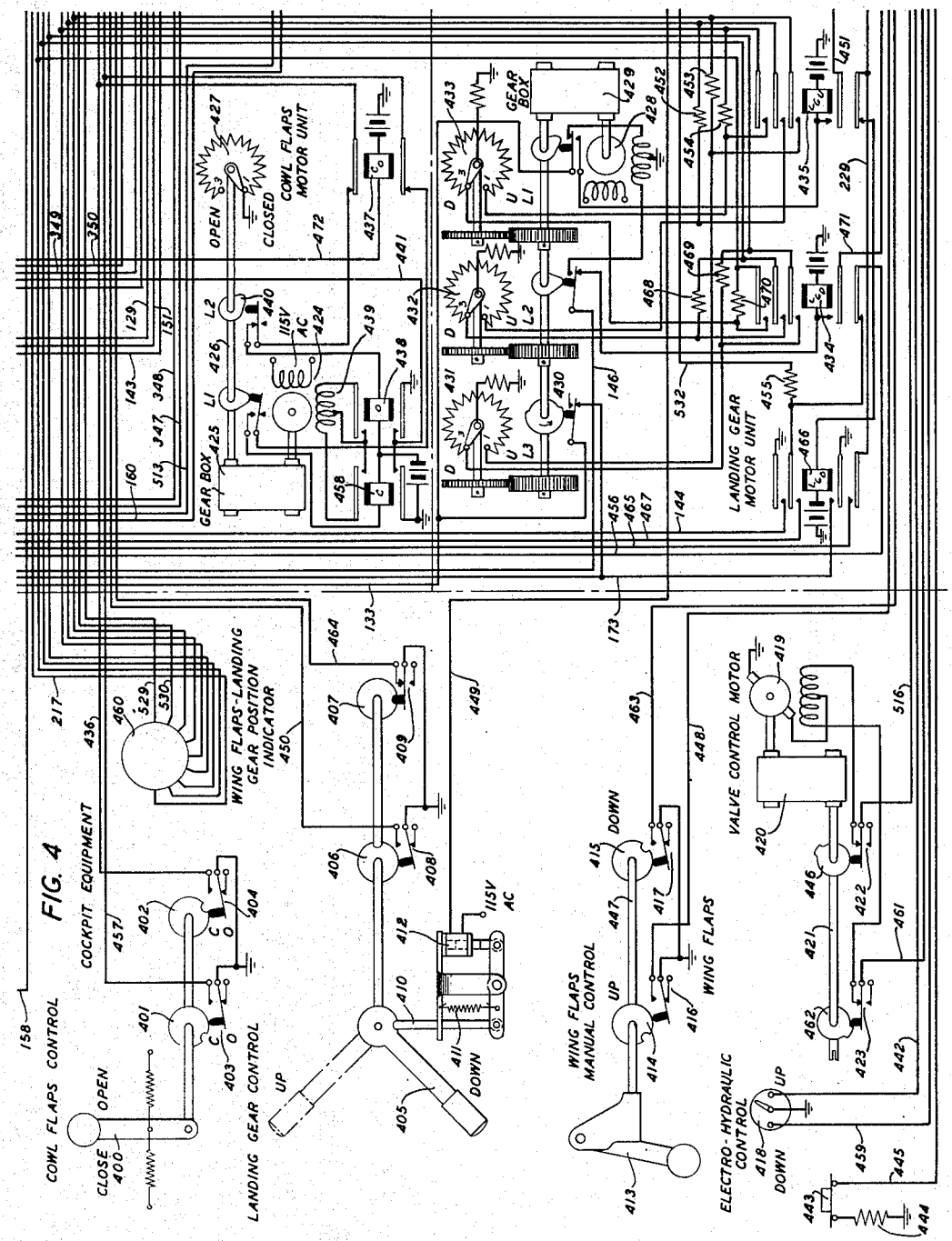

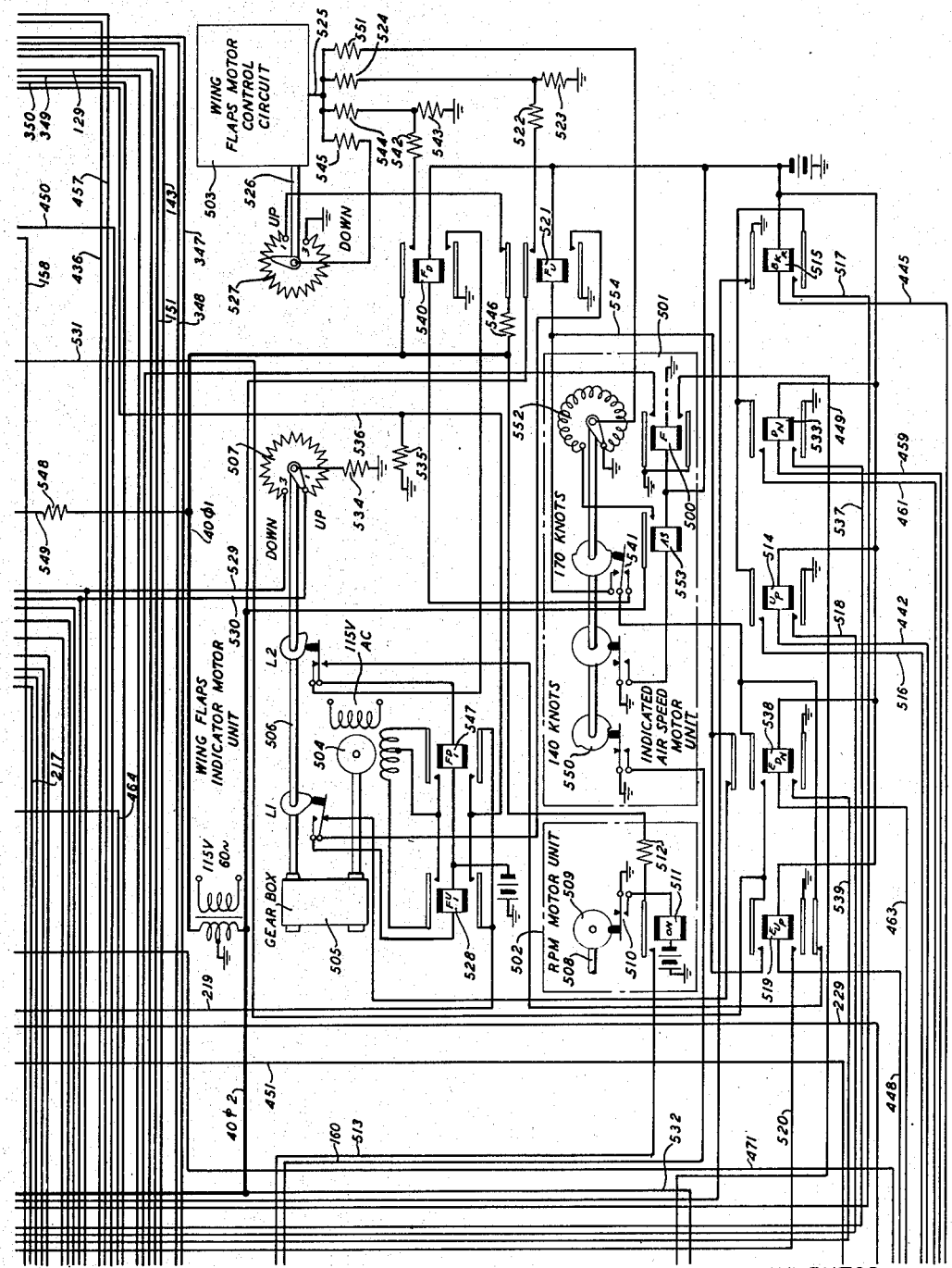

Patented Aug. 22, 1950

2,519,698

UNITED STATES PATENT OFFICE 2,519,698

GROUND TRAINER FOR AIRCRAFT PERSONNEL

Frank M. Pearsall, Merrick, N. Y., assignor to Bell Telephone Laboratories, Incorporated, New York, N. Y., a corporation of New York Application October 12, 1945, Serial No. 622,069

34 Claims. (Cl. 35—12)

This invention relates to an operational flight trainer and, more particularly, to circuits and apparatus for simulating the operation of the hydraulic system of an airplane and the response of the hydraulic pressure indicators to the simulated operation of an engine driven compressor, pilot's emergency hand pump, and of hydraulically operated mechanisms such as the wing flaps, engine cowl flaps, landing gear and gun chargers.

The airplane which the trainer is designed to simulate is provided with a hydraulic system for furnishing hydraulic pressure for the operation of various mechanisms of the airplane. The hydraulic system is normally supplied with pressure by an engine driven hydraulic pump or compressor. For applying pressure from the system to operate apparatus hydraulic selector control valves operable by the pilot are provided which permit the lowering and retraction of the landing gear, the operation of the wing flaps, the operation of the engine cowl flaps, the operation of the intercooler and oil cooler shutters, the operation of the wing locking pins and the operation of the gun chargers.

The engine driven pump causes a hydraulic pressure to be built up in the system to 1500 pounds per square inch at which time an unloader valve functions to prevent further pressure build-up. When the pressure falls below 1250 pounds per square inch the unloader valve returns to normal and the engine driven pump can again build up pressure.

If the regular engine driven pump system fails, the hydraulically operated mechanisms of the airplane may still be operated by means of an emergency hand pump and a hand pump selector valve which provides connections over individual hydraulic lines to permit the operation of the landing gear only, of the wing flap only, or of the gun chargers, engine cowl flaps and wing lock pins, depending upon the position of the selector valve and the condition of the individual hydraulic lines.

If the hydraulic system is completely disabled so that no hydraulic pressure may be received from the engine driven pump or from the emergency hand pump, the landing gear may be lowered by means of an emergency compressed air system which consists of a compressed air bottle, air pressure gauge, T-handle control and a separate pipe line from the bottle to the landing gear operating cylinders.

It is the object of the present invention to simulate the functioning of the hydraulic system of an airplane in a ground trainer for pilot training.

In a trainer it is not desirable to duplicate the intricate and expensive mechanisms of an actual airplane which are hydraulically operated or to provide the hydraulic system which would be required to furnish the hydraulic power necessary to operate such mechanisms. Therefore simpler and less expensive electrical equipment is provided which simulates the production of the requisite hydraulic pressure, which simulates the application of hydraulic pressure to the various pieces of hydraulically operated mechanism and which simulates the responses of such mechanisms.

In order that in so far as the pilot under training is concerned, all of the controls and apparatus which he sees in the cockpit of the fuselage of the trainer shall have the same appearance and shall have the same response to operation as the similar equipment of the airplane which the trainer simulates, the actual controls and equipment of an airplane have been modified to produce electrical rather than mechanical or hydraulic effects upon their operation and the pressure gauges or indicators which would normally respond to hydraulic operation to indicate to the pilot the pressure in the hydraulic system or the pressure in the compressed air emergency bottle are operated by electrical telemetric systems. Since the engine operation is simulated in the trainer, electric motor units are provided which simulate the production of hydraulic pressure, the operation of the landing gear, the operation of the engine cowl flaps, and the operation of the wing flaps. The hydraulic pressure drain incident to the operation of the gun chargers is also simulated but no simulation of the pressure drains incident to the operation of the intercooler and oil cooler shutters or to the operation of the wing locking pins are provided since these operations are not required in the trainer.

For a better understanding of the invention, reference may be had to the following detailed description when read in connection with the accompanying drawings in which:

Fig. 1 shows in the portion thereof to the left of the dot-dash line cockpit apparatus including the hydraulic pressure and dump pressure indicators on the pilot's instrument panel, the emergency hydraulic hand pump and hand pump selector valve, the emergency landing gear control and the air bottle and valve, and to the right of the dot-dash line control relays mounted in apparatus cabinets associated with the trainer;

Fig. 4 shows in the portion to the left of the dot-dash line cockpit apparatus including the wing flaps and landing gear position indicator, the cowl flaps control, the landing gear control, the wing flaps manual control, the electrohydraulic wing flaps control and the valve control motor operable by said latter control, and in the portion to the right of the dot-dash line the motor units which simulate the operation of the engine cowl flaps and the landing gear;

Fig. 5 shows in the upper left portion thereof, the motor unit which controls the operation of the wing flaps indicators on the pilot's and in the upper right portion thereof instructor's instrument panels and the motor unit which simulates the operation of the wing flaps, and in the lower portion of the figure other control relays mounted in the apparatus cabinets and the schematic representation of the RPM and indicated air speed motor units of the trainer; and Fig. 6 is a diagram showing how the several figures of the drawings should be assembled to completely disclose the invention.

Figure 1:
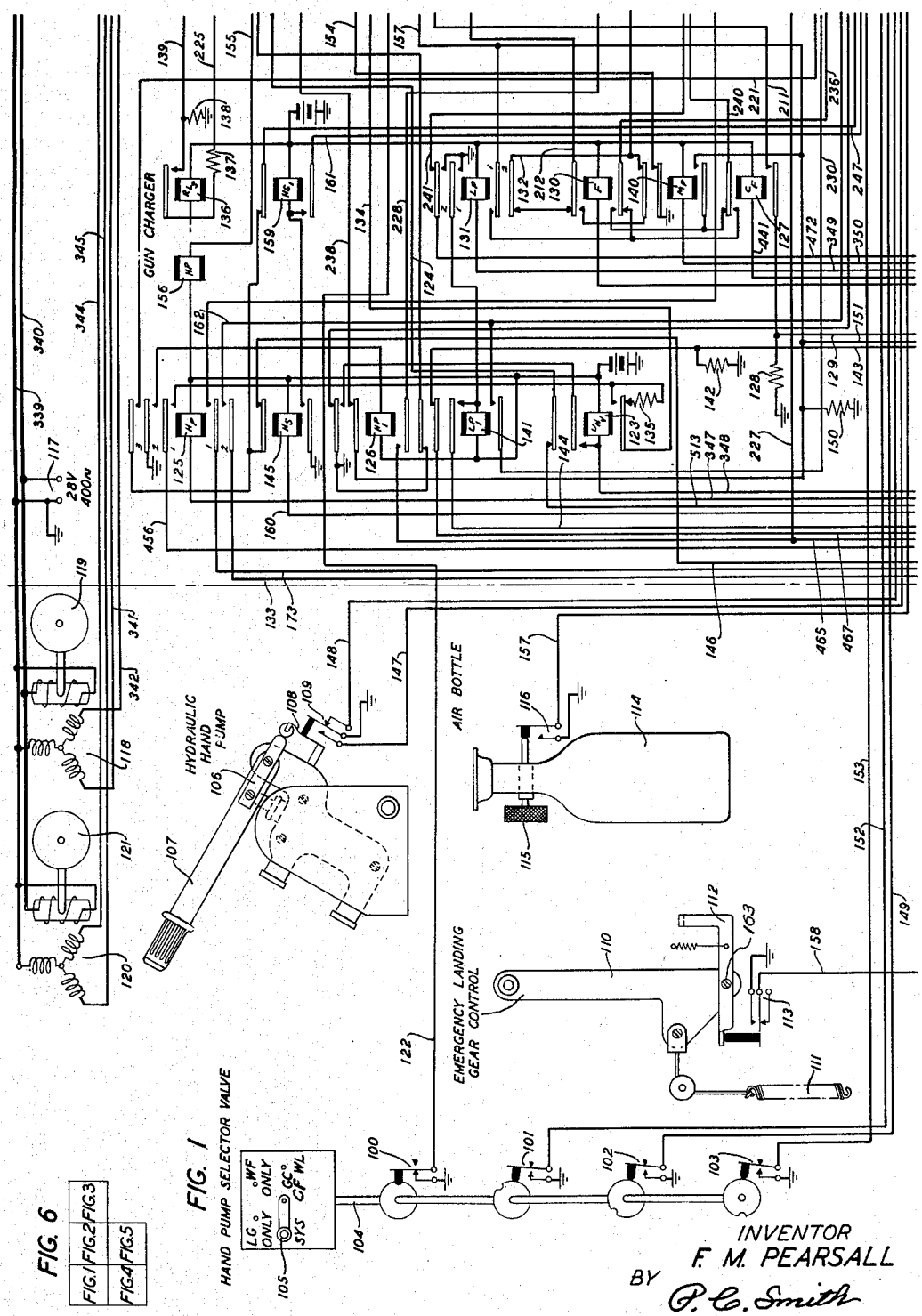
Figure 2:
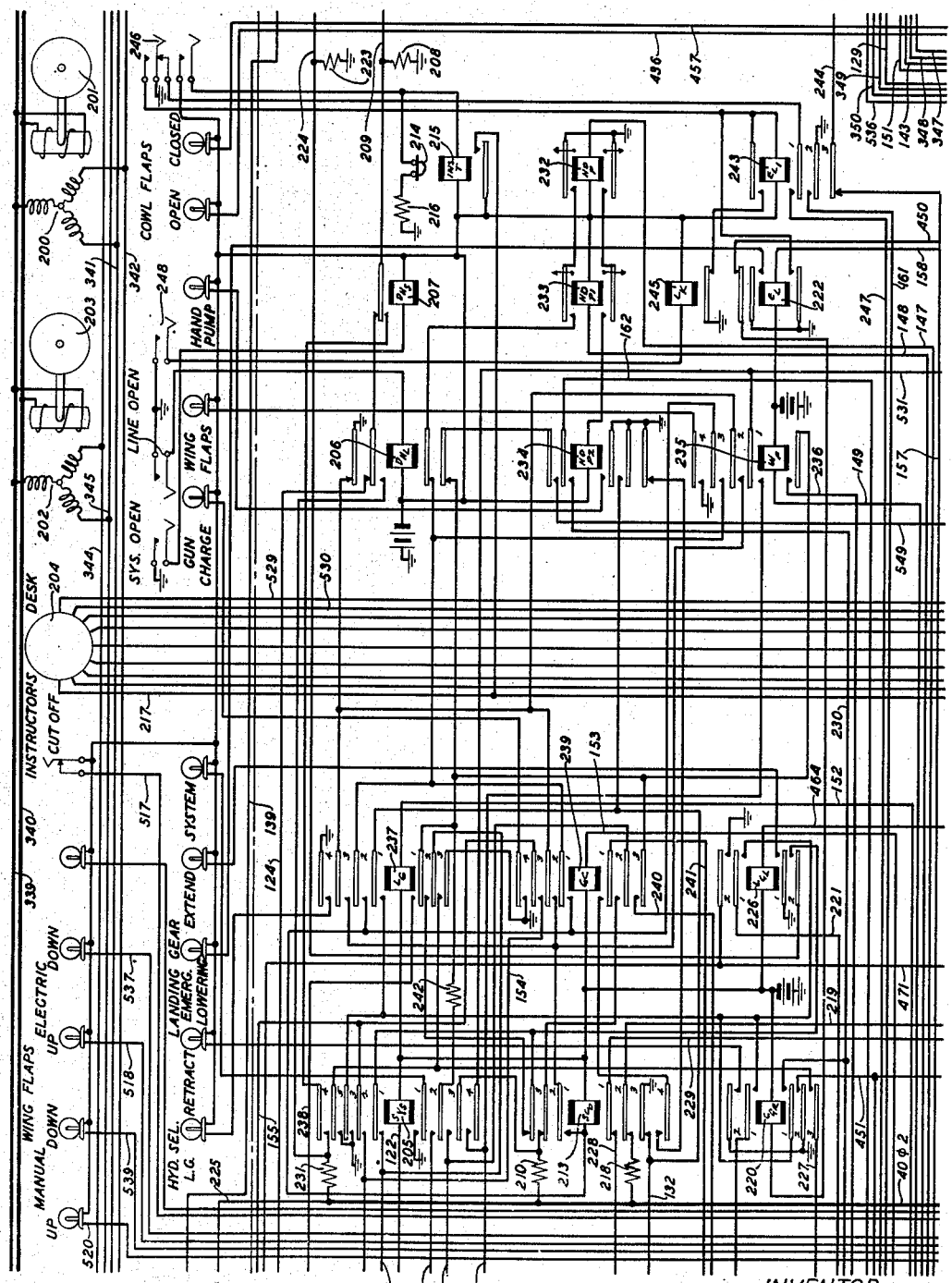
Fig. 2 shows in the portion above the dot-dash line such instruments, controls and lamps at the instructor's desk as relate to the present invention and below the dot-dash line other relays mounted in the apparatus cabinets.

The hand pump selector valve used in an actual airplane has been modified, as schematically disclosed in Fig. 1, by the removal of the valve and by the addition of four switch assemblies 100 to 103, inclusive, operable by cams mounted on a shaft 104 connected to the valve handle 105. The switch assemblies are selectively operated in different positions of the valve handle. Each of the switch assemblies comprises two fixed springs serving as front and back contacts and a movable spring tensioned for engagement with the front contact and carrying an operating stud of insulating material which rests on the surface of the associated cam to hold the movable spring out of contact with the front contact spring except when the cam is rotated to such a position that the end of the stud enters a notch in the periphery of the cam.

The hydraulic hand pump, schematically disclosed in Fig. 1, is modified by the addition of a cam member 106 mounted on the pump handle 107 which, through a spring 108 secured to the casing of the pump, operates the spring assembly 109.

The emergency landing gear control, shown schematically in Fig. 1, comprises a T-handle 110 movable on the pivot bolt 163 against the tension of the spring 111 and in its operated position engageable with the lever 112 also pivoted on bolt 163 to release the movable spring of the spring assembly 113 into its circuit closing position. In an actual airplane the handle 110 operates a valve which permits compressed air from the air bottle 114 to be forced into the hydraulic cylinder of the landing gear to lower the landing gear. The air bottle 114 is a wooden mock-up of the air bottle of an actual airplane and the control valve which connects the bottle with the dump pressure indicator is simulated by the valve screw 115 which when screwed in to a position representative of the closure of the bottle valve holds the spring assembly 116 in its open position.

The cowl flaps control used in an actual airplane has been modified as schematically shown in Fig. 4 by the removal of the valve, the stem of which would be rotated by the T-handle 400 and by the substitution of two cams 401 and 402 operable by the handle to control the two switch assemblies 403 and 404. When the handle is moved to the right or open position the cam 402 permits the spring assembly 404 to operate to its alternate or circuit closing position and when the handle is moved to the left or closed position cam 401 permits the spring assembly 403 to operate to its alternate or circuit closing position.

The landing gear control used in an actual airplane has also been modified as shown in Fig. 4 by the removal of the valve the stem of which would be rotated by the handle 405 and by the substitution of two cams 406 and 407 operable by the handle to control the two switch assemblies 408 and 409. When the handle is moved to its lower or down position the cam 407 permits the release of the spring assembly 409 to its circuit closing position, as indicated, and when it is moved to its up position, indicated by dotted lines, the cam 406 permits the release of the spring assembly 408 to its circuit closing position. In an actual airplane when the airplane is on the ground the weight of the airplane on its landing wheels causes the operation of a locking device associated with the control handle 405 which prevents the movement of the handle from its landing gear down position to the landing gear up position so that the landing gear may not be retracted while the airplane is on the ground. This is simulated in the control used in the trainer by the provision of a locking pin 410 which is forced into a hole in the hub of the handle 405 by the spring 411 when the handle is in the down position to prevent the movement of the handle to its up position. For retracting the pin to release the handle the solenoid 412 is provided which is energizable only when the simulated flight has left the ground as represented by the operation of the flight (F) relay 500 of the indicated air speed motor unit 501 of Fig. 5.

The manual wing flaps control on an actual airplane has been schematically modified as shown in Fig. 4 by the removal of the valve the stem of which is rotated by the handle 413 and by the substitution of the cams 414 and 415 rotatable by the handle 413 to operate the switch assemblies 416 and 417. When the handle is rotated to the flaps down position cam 415 is rotated to a position in which it permits switch assembly 417 to release into its circuit closing position and when the handle is rotated to the flaps up position cam 414 is rotated to a position in which it permits switch 416 to release into its circuit closing position.

In the airplane the valve controlled by the manual wing flaps control may also be operated by an electric motor which may be controlled to run in one direction to operate the valve to its flaps down position and to run in the opposite direction to operate the valve to the flaps up position under the control of a switch located on the left side of the cockpit. This equipment is simulated in the trainer by a motor unit controlled by the switch 418. The motor unit comprises a reversible series-connected split field direct current motor 419 geared through reduction gearing 420 to a shaft 421 which controls cam operated limit switches 422 and 423 to limit the operation of the motor in either direction in response to the operation of the control switch 418. Actually the shaft 421 is aligned with the shaft 447 of the manual control and is provided with a slot which engages the handle 413 so that with the handle in the position shown the shaft 421 is coupled to the shaft 447 through the handle. When the pilot desires to use the manual control he presses the handle 413 thereby uncoupling it from the shaft 421.

Figure 3:
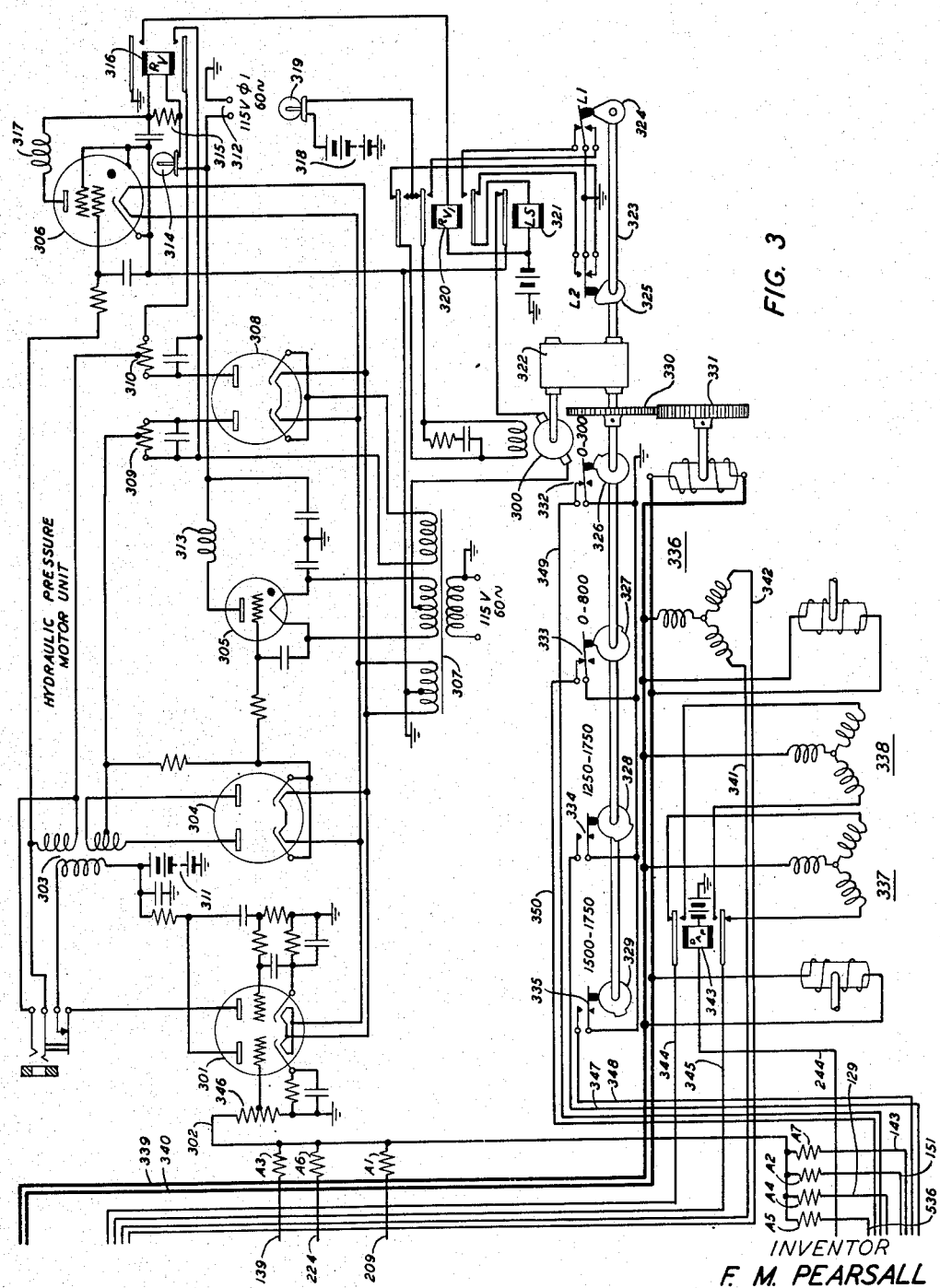
Fig. 3 shows the hydraulic pressure motor control circuit and motor unit.

The hydraulic pressure motor control circuit and motor unit, schematically illustrated in Fig. 3, is of the type disclosed and fully described in the application of Albert, Davis, Gumley and Holden, Serial No. 502,484, filed September 15, 1943. This application has matured into Patent No. 2,428,767 dated October 14, 1947. In general the circuit for controlling the motor 300 comprises a dual triode amplifier tube 301 which receives a signal incoming on signal control conductor 302, amplifies it and applies it through the step-up transformer 303 to the plates of the dual diode rectifier tube 304. The tube 304 serves as a full wave rectifier to rectify the output signal from the tube 301 and to apply it as a positive potential to the grid of the gas-filled motor impulsing tube 305. The output potential of tube 301 is also applied through the upper secondary winding of transformer 303 to the control grid of the gas-filled motor reversing tube 306. Direct current for furnishing grid bias to the control grids of tubes 305 and 306 whereby such tubes are normally biased just under the critical firing potential, is supplied from the right secondary winding of the power transformer 307 through the dual diode rectifier tube 308 under the control of the grid bias control rheostats 309 and 310. Filament heating current for all of the tubes is supplied from the other secondary windings of power transformer 307. Plate potential is supplied to the plates of amplifier tube 301 from the +130-volt plate battery 311 and 60-cycle, 115-volt plate potential is applied from the source 312 through choke coil 313 to the plate of tube 305 and through the ballast resistance lamp 314 thence through resistance 315 and the winding of the RV plate relay 316 in parallel and through the choke coil 317 to the plate of tube 306.

The motor 300 is of the direct current reversible type whose stator circuit is energized by current from the direct current battery 318 through ballast resistance lamp 319 under the control of the RV1 reversing relay 320 which in turn is under the control of the RV plate relay 316, and whose rotor winding is energized by positive pulses of current transmitted therethrough by the firing of the gas-filled tube 305. When the input signal potential applied to conductor 302 is in phase with the potential applied to the plate of tube 306, relays 316 and 320 will operate and since the rectifier tube 304 functions to make the grid of tube 305 positive in response to both half waves of a signal regardless of the phase of the signal with respect to the phase of the potential applied to the plate of tube 305, the tube 305 will cause the transmission of an impulse through the rotor circuit of the motor 300 each time that the tube 305 fires on each positive half wave of the plate potential and the motor will rotate in one direction. In response to a signal which is out of phase with the potential applied to the plate of tube 306, tube 306 will not conduct and consequently relays 316 and 320 will not operate but, since tube 305 will fire on each positive half wave of the potential applied to its plate, the motor 300 will be operated in response to the incoming signal in the reverse direction of rotation.

The motor 300 through a reduction gear box 322 drives the shaft 323 which carries cams 324 to 329, inclusive, and the gear 330. The cams 324 and 325 control the limit switch assemblies L1 and L2 to cause the operation of the LS relay 321 to stop the motor when the shaft 323 has been turned in either direction to the desired limit of movement. The cams 326 to 329, inclusive, operate the associated spring assemblies at positions in the rotation of shaft 323 representative of different simulated hydraulic pressures in pounds per square inch. For example, the cam 329 causes the closure of the contacts of the associated spring assembly 335 when the shaft 323 is rotated to a position representative of a pressure of 1500 pounds per square inch. The gear 330 drives the gear 331 which is mounted on the rotor shaft of the synchrotransmitter 336.

The motor 300, reduction gear box 322, journal supports (not shown) for the shaft 323, the limit switch assemblies L1 and L2, switch assemblies 332 to 335, inclusive, the synchrotransmitter 336 and the synchrotransmitters 337 and 338 are all mounted on a motor plate above which an apparatus rack is positioned on which all other apparatus shown in Fig. 3 is mounted.

The rotor windings of the synchrotransmitters 336, 337 and 338 are energized by current from the 400-cycle, 28-volt source 117 supplied over the bus bars 339 and 340. The stator windings of the synchrotransmitter 336 are connected over the bus-bar 339 and over conductors 341 and 342 with the corresponding stator windings of the synchroreceivers 118 and 200. The rotors of these synchroreceivers are mounted on the driving shafts of the hydraulic pressure indicators 119 and 201, respectively, mounted on the pilot's and instructor's instrument panels, respectively. The rotor windings of these receivers are also energized from the bus-bars 339 and 340. The stator windings of the synchrotransmitter 337 are connected over bus-bar 339 and over conductors 344 and 345, when the dump air pressure (DAP) relay 343 is unoperated, with the corresponding stator windings of the synchroreceivers 120 and 202, and the stator windings of the synchrotransmitter 338 are connected over bus-bar 339 and over conductors 344 and 345, when relay 343 is operated, with the corresponding stator windings of the synchroreceivers 120 and 202. The rotors of the receivers 120 and 202 are mounted on the driving shafts of the dump air pressure indicators 121 and 203, respectively, mounted on the pilot's and instructor's instrument panels, respectively. The rotor windings of these receivers are also energized from the bus-bars 339 and 340.

The indicated air speed, RPM and wing flaps motor units schematically illustrated in Fig. 5 by the apparatus enclosed in the dot-dash rectangles 501, 502 and 503 are similar in construction to the motor unit of Fig. 3 and to the motor unit disclosed in Patent No. 2,428,767 hereinbefore referred to but, in addition, are provided with potentiometers and variacs driven from their motor driven shafts.

The motor unit 504 of the wing flaps indicator motor unit of Fig. 5 is of the reversible alternating current shaded pole type having a main stator winding and shaded pole windings. A motor of this type is caused to rotate in one direction by energizing its stator winding and short-circuiting one of its shaded pole windings and to rotate in the opposite direction by energizing its stator winding and short-circuiting its other shaded pole winding. The motor 504 through the reduction gear box 505 drives the shaft 506 which in turn drives the cams of limit switches L1 and L2 and the slider of potentiometer 507. The potentiometer 507 controls the wing flaps portion of the position indicators 204 and 460 on the instructor's and pilot's instrument panels to show the position of the wing flaps.

The cowl flaps motor unit shown in the upper right portion of Fig. 4 is of similar construction to the wing flaps indicator motor unit and also employs a reversible alternating current motor 424 of the shaded pole type.

The landing gear motor unit shown in the lower right portion of Fig. 4 is in general similar to the wing flaps indicator motor unit and is driven by a reversible alternating current motor 428 of the shaded pole type. The shaft 430, in addition to driving the cams for operating the limit switches L1 and L2 also drives the cam which operates the switch assembly L3 when the shaft 430 is in a position representative of the condition in which the landing gear is about 40 per cent retracted, and through gearing drives the sliders of a plurality of potentiometers of which three 431, 432 and 433 have been disclosed herein. These potentiometers together with the LGD and LGU relays 434 and 435 control the landing gear portions of the position indicators 204 and 460 on the instructor's and pilot's instrument panels to show the positions of the right, left and tail wheels of the landing gear.

The apparatus employed in carrying out the invention having now been described, the operation of the apparatus in training a pilot will now be discussed.

It will be assumed that the hydraulic system is functioning properly and that the hand pump selector valve handle 105 has been operated into the SYS position in which position in an actual airplane the hydraulically operated apparatus would be operable by the hydraulic pressure supplied to the hydraulic system by the engine driven pump. In this position a circuit is established from ground over the contacts of switch assembly 100, now closed, over conductor 122 and through the winding of the SYS relay 205 to battery. Relay 205 upon operating simulates the closure of the hand pump selector valve to the SYS position and such operation is indicated by the closure of the circuit from ground over the lower No. 1 contacts of relay 205 and through the System lamp at the instructor's desk to battery.

When the pilot has operated the proper switches and controls of the trainer to simulate the starting of the engine, the RPM motor unit 502 will be operated in the manner fully described in the application of C. E. Germanton, Serial No. 622,070 filed concurrently herewith, to rotate its shaft 508 to a position representative of the simulated engine speed. When the shaft 508 leaves its normal position, the cam 509 driven by the shaft operates the spring assembly 510 to its alternate position in which the circuit of the ON relay 511 is established indicative of the fact that the engine is then running and driving the hydraulic pressure pump driven thereby. The operation of relay 511 now establishes the circuit of a potential divider which may be traced from the 40φ1 busbar, through resistance 512, over the contacts of relay 511, over conductor 513, over the upper back contacts of the unloader valve (UNV) relay 123, over conductor 124, over the inner upper back contact of the DHL relay 206, over the back contact of the DHS relay 207 and to ground through resistance 208.

Potential of phase φ1 derived from this potential divider is applied over conductor 209 and through resistor A1 to control conductor 302 of the hydraulic motor control circuit of Fig. 3. This signal potential is applied through the control rheostat 346 to the control grid of the left unit of voltage amplifying tube 301, is amplified by the two units of such tube connected in cascade, and the amplified potential is impressed upon the primary winding of input transformer 303. Transformer 303 steps up this potential and applies it to the plates of the full wave rectifier tube 304 and to the control grid of the gas-filled motor reversing tube 306. The signal potential as rectified by the tube 304 is impressed upon the control grid of the gas-filled motor impulsing tube 305. As previously stated the tubes 305 and 306 are biased just below their critical breakdown or firing potential by positive biasing potential applied to their control grids under the control of the rectifier tube 304 and the bias adjusting rheostats 309 and 310. As a result of the application of the rectified signal potential applied to the control grid of tube 305, tube 305 will become conducting during each positive half wave of the plate potential applied from the source 312 through choke coil 313 to its plate and an impulse of positive current will flow from the source 312, over the plate-cathode path through the tube 305 to the mid-tap of the middle secondary winding of transformer 307, thence through the rotor circuit of motor 300, over the back contact of the LS relay 321 and to ground. At the same time the potential applied to the control grid of tube 306 being of phase φ2 which is opposite in phase to the plate potential applied to the plate of tube 306, tube 306 does not fire and the RV relay 316 consequently does not operate to cause the operation of the RV1 relay 320.

With relay 320 unoperated the stator winding of motor 300 is energized over a circuit extending from the +130-volt battery 318, through ballast lamp 319, over the inner upper back contact of relay 320, through the stator winding of motor 300, over the upper back contact of relay 320, over the normally closed contacts of limit switch L2 and to ground. The motor thus has its stator winding energized in such a direction that in response to the current impulses transmitted through its rotor winding under the control of tube 305, as previously described, the motor rotates in such a direction that, through the reduction gear box 322, shaft 323 is rotated at a slow speed in a direction indicative of the production of an increasing hydraulic pressure in the hydraulic system. This increasing pressure is indicated on the hydraulic pressure indicators 119 and 201 on the pilot's and instructor's instrument panels through the operation of the synchrotransmitter 336 driven by the shaft 323 through the gears 330 and 331, and the synchroreceivers 118 and 200.

When the motor shaft 323 reaches a position corresponding to a pressure of 1250 pounds per square inch the cam 328 operates the switch assembly 334 to its alternate position in which it will remain should the pressure continue to increase to 1750 pounds per square inch. With the switch assembly 334 thus operated a circuit is established from ground over the contacts of such switch assembly, over conductor 347 and through the winding of the HP relay 125 to battery. Relay 125 now operates and over its upper No. 2 contacts establishes an obvious circuit for the auxiliary HP1 relay 126. The operation of these relays simulates the increase of pressure in the hydraulic system to a high enough value to permit the operation of any of the hydraulically operated mechanism of an airplane.

As the motor driven shaft 323 continues to rotate and reaches a position corresponding to a pressure of 1500 pounds per square inch, the cam 329 operates the switch assembly 335 to its alternate position in which it will remain should the pressure continue to increase to 1750 pounds per square inch. With the switch assembly 335 thus operated a circuit is established from ground over the contacts of the switch assembly, over conductor 348 and through the winding of the UNV relay 123 to battery. Relay 123, which simulates the operation of the unloader valve of the hydraulic system of an airplane when the hydraulic pressure has been built up to 1500 pounds per square inch, now operates and at its back contacts opens the potential divider from which signal potential of phase $\varphi 1$ was derived and applied to control conductor 302 of the hydraulic pressure motor control circuit of Fig. 3. With the signal potential removed tube 305 ceases to fire and motor 300 comes to rest. Shaft 323 is now stopped in a position representative of a pressure of 1500 pounds per square inch and the indicators 119 and 201 will indicate this pressure. Relay 123 upon operating locks over its upper front contact to ground at the upper No. 1 front contact of the HP1 relay 126 and will thus remain operated until the simulated pressure in the hydraulic system drops below 1250 pounds per square inch at which time relay 126 will release.

*Cowl flaps opened*

In order that the engine may not heat up too rapidly during the warming up period unless the air temperature is very low, the pilot operates the engine cowl flaps control handle 400 to the "open" position to hydraulically control the opening of the cowl flaps. In the trainer this is simulated by the operation of the cowl flaps control handle 400 to the "open" position thereby rotating the cam 402 into a position permitting the spring assembly 404 to move to its alternate positon. A circuit is thereby established from ground over the contacts of switch assembly 404, over conductor 436, over the upper back contact of the CO relay 437, over the normally closed contacts of the limit switch assembly L2 and through the winding of the O relay 438 to battery. Relay 438 upon operating shunts the right shaded pole winding 439 of the motor 424 and with the stator winding of the motor energized from the supply source of 115-volt alternating current, the motor 424, through the reduction gear box 425, turns the shaft 426 at a slow speed in a counter-clockwise direction representative of the opening of the cowl flaps. The shaft continues rotating so long as the control switch 400 is held in the "open" position or until the cam 440 of the L2 limit switch opens the circuit of relay 438 to thereby stop the motor.

Relay 438 when operated also establishes a circuit from ground over its lower contacts and conductors 441 through the winding of the CF relay 127 to battery. Relay 127 upon operating establishes a potential divider circuit from the 40$\phi$2 bus-bar, through resistance 210, over the lower No. 3 contacts of the SYS relay 205, over conductor 211, over the lower contacts of relay 127 and through resistance 128 to ground. From this potential divider potential of phase $\phi 2$ is derived and applied over conductor 129 and through resistor A4 to control conductor 302 of the hydraulic pressure motor control circuit. This potential simulates the hydraulic pressure drain which would result in an airplane by applying hydraulic pressure to the cylinder which operates the engine cowl flaps. In response to this potential the motor 300 of the motor control circuit rotates the shaft 323 in a direction representative of a reduction in hydraulic pressure which will be indicated by the pressure indicators 119 and 201. If, as assumed, the pressure in the hydraulic system is 1500 pounds per square inch, that pressure will now drop to just below 1250 pounds per square inch due to the simulation of the opening of the cowl flaps.

The shaft 323 has now rotated cam 328 into a position in which the spring assembly 334 is released thereby releasing the HP relay 125 followed by the release of the HP1 relay 126. Relay 126 upon releasing opens the locking circuit of the UNV relay 123 and since the initial operating circuit for relay 123 is opened at the contacts of spring assembly 335, relay 123 now releases and re-establishes the previously traced circuit over which the engine pump signal of phase $\varphi 1$ was applied through resistor A1 to conductor 302 of the hydraulic pressure motor control circuit. Motor 300 is now operated to rotate shaft 323 in a direction representative of an increase in pressure, cam 328 again operates the spring assembly 334 to cause the reoperation of relays 125 and 126 when a simulated pressure above 1250 pounds per square inch is attained, and cam 329 again operates the spring assembly 335 to cause the reoperation of the UNV relay 123 which removes the phase $\varphi 1$ engine pump signal from control conductor 302 of the hydraulic pressure motor control circuit to stop the motor 300 when a pressure above 1500 pounds per square inch is again attained.

With the phase $\varphi 1$ engine pump signal removed, the cowl flaps drain signal of phase $\varphi 2$ again reduces the pressure to just below 1250 pounds per square inch whereupon the engine pump signal of phase $\varphi 1$ is again cut in and the pressure increases. This cycle continues until the flaps are fully operated and the release of the O relay 438 removes the phase $\varphi 2$ drain signal. During the flaps operation there will be less than two cycles of hydraulic pressure operation as just described and the pointers of the indicators 119 and 201 will oscillate between 1250 and 1500 pounds per square inch.

The instructor is informed concerning the operation of the cowl flaps control 400 to the "open" position by the lighting of the Cowl Flaps Open lamp at the instructor's desk over a circuit extending from ground over contacts of switch assembly 404 and over conductor 436 through the Cowl Flaps Open lamp to battery.

*Wing flaps operated to the up position*

Before simulating a take-off the pilot operates the wing flaps control switch 418 to its "up" position thereby establishing a circuit from ground over the UP contacts of such switch, over conductor 442 and to battery through the winding of the UP relay 514. Assuming that the pilot has previously closed the circuit breaker 443 thereby establishing a circuit from ground through resistance 444, over contacts of the circuit breaker and over conductor 445 to battery through the winding of circuit breaker (BKR) relay 515 to operate relay 515, the operation of relay 514 is effective to establish a circuit from ground through the armature circuit and right field winding of motor 419, over the contacts of limit switch 422, over conductor 516, over the upper contacts of relay 514, over the lower contacts of relay 515, over conductor 517 and to battery over the contacts of the cut-off switch at the instrctor's desk. The motor 419 through the gear box 420 now operates to turn the shaft 421 at a slow speed in a direction representative of the flaps up position. When the shaft is rotated to a position representing a full "up" position of the flaps the cam 446 operates the spring assembly 422 to open the circuit of the motor 419 which then stops. During the time relay 514 is operated a circuit is established from ground over its lower contacts and over conductor 518 to battery through the Wing Flaps Electric Up lamp, at the instructor's desk to inform the instructor that the wing flaps are being moved to their up position under electrohydraulic control.

As a further result of the operation of motor 419, the shaft 447 of the Wing Flaps Manual Control is turned to a position in which the cam 414 permits the closure of the contacts of spring assembly 416 thereby establishing a circuit from ground thereover, over conductor 448 and through the winding of the EUP relay 519 to battery. Relay 519 upon operating establishes a circuit from ground over its lower contacts and conductor 520 to battery through the Wing Flaps Manual Up lamp at the instructor's desk to inform the instructor that the flaps are being moved to their up position. Relay 519 also establishes a circuit for the FU relay 521 which may be traced from battery through the winding of such relay, over the upper contacts of relay 519, over conductor 531, over the lower No. 4 contacts of the SYS relay 205, over conductor 212, over the upper back contact of the F relay 130, since the assumed flight is not yet airborne, over the lower No. 2 back contact of the low pressure (LP) relay 131, which is not operated since the hydraulic system has been assumed to have a pressure greater than 300 pounds per square inch, over conductor 132, and to ground at the lower No. 3 back contact of the SCO relay 213.

Relay 521 upon operating establishes a potential divider circuit from the 40φ2 bus-bar, over the upper front contact of relay 521 and through resistances 522 and 523 to ground, from which potential divider a potential is derived and applied through the resistor 524 to the signal input conductor 525 of the wing flaps motor control circuit 503. Under the control of the control circuit 503 the motor thereof rotates the shaft 526 in a direction representative of the movement of the flaps to their up position and since the potentiometer 527 driven by the shaft 526 has been rendered ineffective by the opening of the energizing circuit therefor at the upper back contact of relay 521, the motor rotates the shaft 526 into the position representative of a fully up position of the wing flaps or until the potentiometer slider is at the No. 1 terminal of its winding, at which time the circuit of the motor is opened by the limit switch (not shown) in a manner described in connection with the motor control circuit of Fig. 3.

Relay 521 also establishes a circuit from ground over its lower contacts, over the upper contact of the L1 limit switch of the wing flaps indicator motor unit, which would be in its released position, and through the winding of the FU1 relay 528 to battery. Relay 528 thereupon operates to establish over its upper contacts a shunt of the left shaded pole winding of motor 504 and, since the stator winding of the motor is energized by current from the 115-volt alternating current supply, the motor will operate to turn the shaft 506 in a direction representative of the movement of the wing flaps to their up position until the limit switch L1 operates to the position shown in the drawing to release relay 528 and to thereby stop the motor. A locking circuit is now established for relay 521 which may be traced from battery through its winding over the back contact of the EDN relay 538 released, over the alternate contacts of the L1 limit switch of the wing flaps indicator motor unit and to ground at the lower contacts of relay 521. Thus, if the flaps are in their full up position, the loss of hydraulic pressure will not cause relay 521 to release and cause the flaps motor unit 503 to assume some position away from the full up position.

The rotation of the shaft 506 in a clockwise direction to the limit of its movement, results in the movement of the slider of potentiometer 507 to the No. 1 terminal of its winding. The winding of potentiometer 507 is connected over conductors 529 and 530 to the end terminals of the windings of the telemetric receivers of the indicators 469 and 204 in the cockpit and at the instructor's desk. With the INST circuit breaker 214 on the pilot's electrical distribution panel closed to establish the circuit of the INST circuit breaker relay 215 over a circuit from ground, through resistance 216, through the circuit breaker and winding of relay 215 to battery, operating battery is supplied over the contacts of relay 215 and conductor 217 to the junction point between the windings of the telemetric receivers of the indicators 469 and 204. The windings of the receivers and the winding of potentiometer 507 serve as a direct current telemetric system so that as the slider of potentiometer 507, which is connected through resistance 534 to ground, moves the permanent magnet rotors of the telemetric receivers in the indicators move pointers thereof to positions corresponding to the position of the slider of potentiometer 507, or the simulated position of the wing flaps. Since the indicators are only incidentally concerned with the present invention a full disclosure thereof is not deemed essential herein.

In addition, relay 528 establishes a potential divider circuit which may be traced from the 40φ2 bus-bar through resistance 218, over the lower No. 2 back contact of the SCO relay 213, over conductor 219, over the lower contacts of relay 528 and through resistance 535 to ground from which potential divider a wing flaps drain signal of phase φ2 is derived and applied over conductor 536 and through resistor A5 to control conductor 302 of the hydraulic pressure motor control circuit. This signal simulates the hydraulic pressure drain which would result in an airplane by applying hydraulic pressure to the wing flaps operating cylinders. In response to this signal the motor 300 of the motor control circuit rotates the shaft 323 in a direction representative of a reduction in hydraulic pressure which will be indicated by the pressure indicators 119 and 201. Assuming that the pressure in the hydraulic system is 1500 pounds per square inch, that pressure will now be reduced to just below 1250 pounds per square inch due to the simulation of the operation of the wing flaps.

The shaft 323 has now rotated cam 328 into a position in which the spring assembly 334 is released thereby releasing the HP relay 125 followed by the release of the HP1 relay 126. Relay 126 upon releasing opens the locking circuit of the UNV relay 123 and, since the initial operating circuit for relay 123 is opened at the contacts of spring assembly 335, relay 123 now releases and reestablishes the previously traced circuit over which the engine pump signal of phase $\varphi 1$ was applied through resistor A1 to control conductor 302 of the hydraulic pressure motor control circuit. The motor 300 is now operated to rotate shaft 323 in a direction representative of an increase in pressure, cam 328 again operates the spring assembly 334 to cause the reoperation of relays 125 and 126 when a simulated pressure of 1250 pounds per square inch is attained, and cam 329 again operates the switch assembly 335 to cause the reoperation of relay 123 which removes the phase $\varphi 1$ engine pump signal from conductor 302 of the hydraulic pressure motor control circuit to stop the motor 300 when a pressure above 1500 pounds per square inch is attained.

When the phase $\varphi 1$ engine pump signal removed, the wing flaps drain signal of phase $\varphi 2$ again reduces the pressure to just below 1250 pounds per square inch whereupon the engine pump signal of phase $\varphi 1$ is again cut in and the pressure increases. This cycle continues until the wing flaps are fully operated to their up position and the release of the FU1 relay 528 removes the phase $\varphi 2$ drain signal. During the flaps operation there will be about two cycles of hydraulic pressure operation as just described and the pointers of the indicators 119 and 201 will oscillate between 1250 and 1500 pounds per square inch.

The Wing Flaps Electric Up lamp at the instructor's desk and the Wing Flaps Manual Up lamp remains lighted so long as the wing flaps are maintained in their up position.

*Landing gear retraction*

It will now be assumed that the pilot has simulated a take-off and that the flight instruments indicate that the flight is air-borne. The pilot may now retract the landing gear and to do so he operates the landing gear control handle 405 to the "up" position. He may do so because with the flight assumed to be air-borne the solenoid 412 is energized to remove the locking pin 410 from the hub of the handle 405 over a circuit which may be traced from the 115-volt source of power, through the winding of the solenoid, over conductor 449 to ground over the lower contacts of the F relay 500 of the indicated air speed motor unit 501 which becomes energized as soon as the simulated flight becomes air-borne. When the handle 405 reaches its "up" position the cam 406 permits the spring assembly 408 to release thereby establishing a circuit from ground, over the contacts of such assembly, over conductor 450, over the upper back contact of the EL relay 222 and to battery through the landing gear retract (LGR) relay 220. Relay 220 upon operating establishes a circuit over its upper contacts to battery through the Landing Gear Retract lamp at the instructor's desk to inform the instructor that the pilot is taking steps to retract the landing gear.

Relay 220 also establishes a circuit from ground over the upper No. 5 contacts of the SYS relay 205, over the lower No. 3 contacts of relay 220, over conductor 227, over the inner lower contacts of the HP1 relay 126, which will be operated if the simulated hydraulic pressure is over 1250 pounds per square inch, over conductor 228, over the lower No. 1 back contact of the SCO relay 213, over conductor 229, over the lower back contact of the LGU relay 435, and through the winding of the LGO relay 466 of the landing gear motor unit to battery. Relay 466 thereupon operates and locks over the lower back contact of relay 435, over its own lower front contact, over conductors 465 and 227 and thence as traced to ground at the upper No. 5 contacts of the SYS relay 205.

Relay 466, upon operating, establishes a potential divider circuit extending from the 40$\varphi 2$ bus-bar over conductor 532, through resistance 455, over the inner upper contacts of relay 466, over conductor 467, over the upper back contact of the LP1 relay 141, to ground through resistance 142. A heavy drain signal is derived from this potential divider and applied over conductor 143 and through resistor A7 to control conductor 302 of the hydraulic pressure motor control circuit. This signal causes the motor 300 to rotate the shaft 323 in a direction representative of a rapid drop in pressure to just below 300 pounds per square inch. As before described, when the pressure drops below 1250 pounds per square inch, the HP relay 125 releases followed by the release of the HP1 relay 126 and the release of the UNV relay 123. Relay 123, upon releasing, reapplies the engine pump signal of phase $\varphi 1$ as previously described. The drain signal of phase $\varphi 2$, however, has a magnitude greater than that of the engine pump signal and the motor continues to operate the shaft 323 to represent a fall in pressure to a value under 300 pounds per square inch as shown by the pressure indicators 119 and 201. This simulates the action of the actual airplane hydraulic system which drops to a very low pressure when the retraction of the landing gear is started because the landing gear moves part way up rapidly due to the action of the slip stream and the hydraulic fluid rushes into the cylinders thereby decreasing the hydraulic pressure in the system of the airplane. In order to fully retract the landing gear the pressure must again be built up.

In the trainer when the simulated pressure drops just below 300 pounds per square inch, the cam 326 mounted on shaft 323 of the hydraulic pressure motor unit operates the spring assembly 332 to its circuit closing position, thereby establishing a circuit from ground over the contacts of the assembly, over conductor 349 to battery through winding of the LP relay 131. Relay 131 thereupon operates and establishes an obvious circuit for the LP1 relay 141 which also operates and at its upper back contact opens the potential divider circuit from which the heavy drain signal was applied over conductor 143 and through resistance A7 to control conductor 302 of the hydraulic pressure motor control circuit. The engine pump signal of phase $\varphi 1$ is now fully effective to drive the hydraulic pressure up. When the motor 300 has now rotated the shaft 323 in a direction representative of an increase in pressure until the simulated pressure is above 300 pounds per square inch, cam 326 permits the spring assembly 332 to open thereby releasing the LP relay 131. Relay 131 upon releasing opens the operating circuit of the LP1 relay 141 but this relay remains locked up over its inner upper contacts, over conductor 144 and to ground at the upper contacts of the LGO relay 466 associated with the landing gear motor unit.

The LGO relay 466 upon operating also establishes a circuit from ground over its inner lower contacts, over the normally closed contacts of the limit switch L3, over the contacts of limit switch L1, in its released position and through the right shaded pole winding of motor 428 to ground, whereupon the motor 428 through the gear box 429 turns the shaft 430 in a direction representative of the retracting of the landing gear. This movement will continue until a position is reached representative of the condition when the landing wheels would be about 40 per cent retracted or corresponding to the position to which the landing gear wheels would retract rapidly, due to the action of the slip stream, at which time the circuit of the motor is opened by the operation of the L3 limit switch and the motor stops. During this time the simulated hydraulic pressure has dropped to a value less than 300 pounds per square inch and until the pressure has again been built up to about 1250 pounds per square inch the HP relay 125 will not be operated and no alternative circuit for operating the motor 428 will be effective. When, however, the pressure has again been increased to 1250 pounds per square inch and relay 125 again operates and with the LP1 relay 141 locked up, a circuit is established from ground over the upper No. 3 contacts of the SYS relay 205, over the lower No. 1 contacts of the LGR relay 220 over conductor 230, over the lower contacts of the LP1 relay 141, over the lower No. 2 contacts of the HP relay 125, over conductor 133, over the contacts of the L1 limit switch and through the right shaded pole winding of motor 428 to ground. The motor then again operates to rotate shaft 430 at a slow speed in a direction representative of the movement of the landing wheels to their up position. The rotation of the sliders of potentiometers 431, 432 and 433 by the shaft 430 controls the operation of the direct current telemetric receivers of the indicators 204 and 460 to move the right, left and tail wheel indicators to positions indicative of the retracted but unlocked positions of the wheels of the landing gear.

When the shaft 430 has reached a position representative of the movement of the wheels to their retracted position, the limit switch L1 is operated to its alternate position in which the right shaded pole winding of motor 428 is opened and the motor stops. At this time ground on conductor 133 is applied over the alternate contacts of the L1 switch assembly, through the winding of the LGU relay 435 to battery whereupon relay 435 operates, locks over its lower front contact and conductor 451 to ground at the lower No. 2 contacts of the LGR relay 220 and over its upper contacts short-circuits the resistances 452, 453 and 454 which are normally connected between the No. 1 terminals of the windings of the potentiometers 431, 432 and 433 and the telemetric receivers of the indicators 204 and 460. The short-circuiting of these resistances causes the telemetric receivers of the indicators 204 and 460 to receive an increase of operating current causing the red tabs on the indicating members of such indicators to disappear indicative of the fact that the wheels have been locked in their fully retracted positions. Since the indicators are only incidentally concerned with the present invention a full disclosure thereof is not deemed to be essential herein. At its lower back contact relay 435 opens the locking circuit of relay 466 which releases and removes the drain potential from control conductor 302 of the hydraulic pressure motor control circuit. Relay 466 also releases the LP1 relay 141. The motor 300 of the hydraulic pressure motor control circuit will continue to operate until the pressure represented by the rotation of shaft 323 reaches a value of 1500 pounds per square inch when the UNV relay 123 will operate to remove the phase φ1 engine pump signal from control conductor 302 of the motor control circuit.

*Closing engine cowl flaps*

After the take-off, the pilot will operate the cowl flaps handle 400 to the "close" position and hold it in such position for about six seconds. With the handle in such position cam 401 permits the operation of spring assembly 403 to its alternate position thereby establishing a circuit from ground thereover, over conductor 457 to battery through the Cowl Flaps Closed lamp at the instructor's desk to inform the instructor that the engine cowl flaps are being closed and establishing a circuit from conductor 457 over the lower contacts of relay 437 of the cowl flaps motor unit, over the contacts of limit switch L1 now closed and through the winding of the C relay 458 to battery. Relay 458 thereupon operates to short-circuit the left shaded pole winding of motor 424 to thereby cause the motor to drive the shaft 426 in a direction representative of the closing of the cowl flaps so long as the control handle 400 is held in the "close" position. Should the shaft rotate to a position representative of the fully closed position of the flaps the L1 limit switch will open the circuit of relay 458 and stop the motor 424.

As a result of the operation of relay 458 the previously traced circuit for the CF relay 127 is established and relay 127 upon operating causes the application of cowl flaps drain signal of phase φ2 through resistor A4 to control conductor 302 of the hydraulic pressure motor control circuit. The motor 300 then functions to cause the shaft 323 to rotate in a direction representative of a decrease in hydraulic pressure simulating the decrease in pressure incident to the closing of the cowl flaps. The hydraulic pressure circuit functions in the same manner as previously described in connection with the control of the opening of the cowl flaps.

*Operation of the gun chargers*

If during the course of the simulated flight the pilot should operate the gun chargers as fully described in the Patent No. 2,459,867 granted January 25, 1949 to R. B. Buchanan, the RLS relay 136 will be operated each time a gun charger knob is depressed to charge or to safety the guns and will establish a potential divider circuit from the 40φ2 bus-bar over conductor 225, through resistance 137, over contacts of relay 136 and to ground through resistance 138 from which a gun charger drain signal of phase φ2 is derived and applied over conductor 139 and through resistor A3 to control conductor 302 of the hydraulic pressure motor control circuit. This drain signal will cause the motor 300 to turn the shaft 323 in a direction representative of a slight drop in hydraulic pressure. This drop in pressure will not ordinarily be sufficient to cause the establishment of the engine pump signal circuit if the simulated pressure is at 1500 pounds per square inch.

*Operation of wing flaps to the down position*

When a simulated landing is to be made the pilot operates the wing flaps electrohydraulic control switch 418 to the "down" position thereby establishing a circuit from ground over the contacts of the switch, over conductor 459 and through the winding of the DN relay 533 to battery. Relay 533 operates and establishes a circuit from ground through the armature circuit and left field winding of motor 419, over the contacts of spring assembly 423, over conductor 461, over the upper contacts of relay 533, over the lower contacts of relay 515, over conductor 517 and to battery over the contacts of the Cut-Off switch at the instructor's desk. The motor 419 through the gear box 420 operates to turn the shaft 421 in a direction representative of a flaps down condition. When the shaft has reached a position representing a full down position of the flaps required for landing, the cam 462 opens the spring assembly 423 to open the circuit of the motor 419 which then stops. During the time that relay 533 is operated a circuit is established from ground over its lower contacts and over conductor 537 to battery through the Wing Flaps Electric Down lamp at the instructor's desk to inform the instructor that the wing flaps are being moved to their down position under electrohydraulic control.

As a further result of the operation of the motor 419 the shaft 447 of the Wing Flaps Manual Control is moved to a position in which the cam 415 permits the closure of the contacts of the spring assembly 417 thereby establishing a circuit from ground thereover, over conductor 463 and through the winding of the EDN relay 538 to battery. Relay 538 upon operating establishes a circuit from ground over its lower contacts and conductor 539 to battery through the Wing Flaps Manual Down lamp at the instructor's desk to inform the instructor that the flaps are being moved to their down position. Relay 538 also establishes a circuit for the FD relay 540, which may be traced from battery through the winding of such relay, over the contacts of the spring assembly 541 of the indicated air speed motor unit operated as indicated if the air speed is less than 170 knots, over the upper contacts of relay 538, over conductor 531, over the lower No. 4 contacts of the SYS relay 205, over conductor 212, over the upper front contact of the F relay 130, since the flight is assumed to be airborne, over the upper back contact of the MP relay 140, over conductor 132 and to ground at the lower No. 3 back contact of the SCO relay 213.

Relay 540 upon operating establishes a potential divider circuit from the $40\varphi 1$ bus-bar over the upper contacts of relay 540 and through resistances 542 and 543 to ground from which potential divider a potential is derived and applied through the resistor 544 to the signal input conductor 525 of the wing flaps motor control circuit 503. Under the control of the control circuit the motor thereof rotates the shaft 526 in a direction representative of the movement of the flaps to their down position. The movement of the shaft also drives the slider of potentiometer 526 toward the No. 3 terminal of the potentiometer winding and since this winding is energized over a circuit from the $40\varphi 1$ bus-bar through resistance 546 over the upper back contact of relay 521 and through the potentiometer winding to ground, a potential of phase $\varphi 1$ is applied from the slider of the potentiometer through resistor 545 to control conductor 525. The potentials applied through resistors 544 and 545 are of the same phase and are balanced against the potential of phase $\varphi 2$ derived at the slider of the indicated air speed variac 552 which is applied to conductor 525 through resistor 551. The winding of variac 552 is energized from the $40\varphi 2$ bus-bar when the AS relay 553 is operated to indicate air speed. These signals are so proportioned that if the air speed is less than 100 knots the motor of the wing flaps motor unit will drive the shaft 526 to the full down position, but at air speeds between 100 and 170 knots the motor will cause shaft 526 to assume a position away from full down depending upon the speed and reaching a position corresponding to a 20-degree deflection at 170 knots.

Relay 540 also establishes a circuit from ground over its lower contacts, over the contacts of the L2 limit switch of the wing flaps indicator motor unit and through the winding of the FDI relay 547 to battery. Relay 547 thereupon operates to establish over its upper contacts a shunt of the right shaded pole winding of motor 504 and the motor then drives the shaft 506 in a direction representative of the movement of the wing flaps to their down position and through the potentiometer 507 controls the wing flaps indicator pointers of the indicators 204 and 460 to show the movement of the wing flaps in their down position.

In addition, relay 547 establishes a potential divider circuit which may be traced from the $40\varphi 2$ bus-bar, through resistance 218, over the lower No. 2 back contact of the SCO relay 213, over conductor 219, over the lower contacts of relay 547 and to ground through resistance 535, from which potential divider a wing flaps drain signal of phase $\varphi 2$ is applied over conductor 536 and through resistor A5 to control conductor 302 of the hydraulic pressure motor control circuit. This signal simulates the hydraulic pressure drain which would result in the airplane by applying hydraulic pressure to the wing flaps operating cylinders. In response to this signal, the motor 300 of the motor control circuit rotates the shaft 323 in a direction representative of a reduction in hydraulic pressure which will be indicated by the pressure indicators 119 and 201. The indicator needles will oscillate between 1250 and 1500 pounds per square inch during the time the wing flaps indicator motor unit is moving the shaft 506 to its down position, showing a drain on the hydraulic system due to wing flaps operation and the rebuilding of pressure by the engine driven pump. These oscillations are produced in the manner previously described in connection with the simulated movement of the wing flaps to their "up" positions.

When the wing flaps have been moved to their full down positions the Wing Flaps Electric Down lamp at the instructor's desk and the Wing Flaps Manual Down lamp remain lighted so long as the wing flaps are maintained in their "down" position. When the shaft 506 of the wing flaps indicator motor unit reaches a position representative of the full down position of the wing flaps, the L2 limit switch contacts are opened to release relay 547, whereupon the motor 504 stops and the wing flaps drain signal is removed from the control conductor of the hydraulic pressure motor control circuit.

Landing gear to the down position

With the wing flaps in their down position they serve as airbreaks to help reduce the air speed of the airplane for landing. With the air speed reduced, the pilot operates the landing gear control handle 405 to its "down" position thereby opening the circuit over the switch assembly 408 to release the LGR relay 220 whereupon the Landing Gear Retract lamp at the instructor's desk becomes extinguished and the LGU relay 435 of the landing gear motor unit becomes released. With the handle 405 in its "down" position, the cam 407 releases the switch assembly 409 to its circuit closing position thereby establishing a circuit from ground thereover, over conductor 464 and through the winding of the LGL relay 226 to battery. Relay 226, upon operating, establishes an obvious circuit for the Landing Gear Extend lamp at the instructor's desk to inform the instructor that the pilot has taken steps to lower the landing gear.

Relay 226 also establishes a circuit from ground over the upper No. 3 contacts of the SYS relay 205, over the upper No. 1 contacts of the LQL relay 226, over conductor 221, over the upper No. 3 contacts of the HP relay 125, it being assumed that the pressure in the hydraulic system is over 1250 pounds per square inch, over the upper back contact of the HS relay 145, over conductor 146, over the contacts of the L2 limit switch of the landing gear motor unit in its released position and thence through the left shaded pole winding of the motor 428 to ground. With the left shaded pole winding of the motor thus shunted and the stator winding energized from the supply source of 115 volts, the motor 428 is rotated and through the gear box 429 turns the shaft 430 at a slow speed in a direction representative of the movement of the landing wheels to their "down" positions. The rotation of the sliders of potentiometers 431, 432, and 433 by the shaft 430 controls the operation of the direct current telemetric receivers of the indicators 204 and 460 to move the right, left and tail wheel indicators to positions indicative of the extended but not locked positions of the wheels of the landing gear.

When the shaft 430 has reached the position representative of the movement of the wheels to their extended positions, the limit switch L2 is operated to its alternate position in which the left shaded pole winding of motor 428 is opened and the motor stops. At this time ground is connected from conductor 146, over the alternate contacts of the L2 switch assembly, through the winding of the LGD relay 434 to battery, whereupon relay 434 operates, locking over its lower front contact and conductor 471 to ground, over the upper No. 2 contacts of the LGL relay 226. Over its upper contacts relay 434 short circuits the resistances 468, 469 and 470 connected between the No. 3 terminals of the windings of the potentiometers 431, 432 and 433 and the windings of the telemetric receivers of the indicators 204 and 460 and thereby increases the operating current through the windings of the telemetric receivers to cause them to operate their associated indicators to the full limits of their movements.

As a further result of the operation of relay 226, a landing gear drain signal of phase $\varphi 2$ is applied over conductor 224 and through resistor A6 to control conductor 302 of the hydraulic pressure motor control circuit. This potential is derived from the potential divider circuit which is established from the $40\varphi 2$ bus-bar, over conductor 532, through resistance 455, over the lower back contact of the LGD relay 434, until the landing gear is fully extended, over conductor 456, over the upper No. 1 contacts of the HP relay 125, over the lower contacts of the UNV relay 123, over conductor 134, over the No. 1 contacts of the SYS relay 205, over the lower No. 2 contacts of relay 226 and to ground through resistance 223. Thus while the landing gear motor unit is being operated to simulate the extension of the landing gear and until such simulated extension has been completed as represented by the operation of relay 434, the motor 300 of the hydraulic pressure motor control circuit rotates the shaft 323 in a direction representative of a reduction in hydraulic pressure in simulation of the application of hydraulic pressure to the landing gear operating cylinders.

When the hydraulic pressure decreases to 1250 pounds per square inch, relays 125, 126 and 123 release as previously described. Relay 125, upon releasing, opens the potential divider circuit from which the landing gear drain signal of phase $\varphi 2$ was derived and relay 123 upon releasing reapplies the engine pump signal of phase $\varphi 1$ to the hydraulic pressure motor control circuit with the result that the motor 300 thereof now operates to rotate the shaft 323 in a direction representative of an increase in hydraulic pressure. When the pressure again reaches 1250 pounds per square inch the spring assembly 334 is reoperated to cause the reoperation of relays 125 and 126. With these relays reoperated, and relay 123 still unoperated, the resistance 135 is included in the potential divider from which the phase $\varphi 2$ drain signal was derived and applied to the A6 resistor to control conductor 302. As a consequence, a greatly decreased drain signal is applied in opposition to the engine pump signal and the jump signal being greater will cause the simulated hydraulic pressure to increase slowly while the extension of the landing gear continues. The combination of signals is used to simulate the approximation of one hydraulic cycle during the operation of the landing gear.

During this operation, the simulated pressure may build up to 1500 pounds per square inch thereby causing the operation of the UNV relay 123 as previously described to entirely remove the pump signal whereupon the motor 300 will respond only to the drain signal and the simulated pressure will start decreasing as before. When the landing gear is fully extended and the LGD relay 434 has operated, the drain signal is removed at its lower back contact. The simulated hydraulic pressure may now remain somewhere between 1250 and 1500 pounds per square inch or it may build-up to 1500 pounds per square inch again depending upon whether relay 123 is operated or not, as determined by the position of shaft cam 329.

Hand pump operation

Hand pump operation of the hydraulically operated mechanisms of an airplane may be used when the airplane is grounded and the engine is not driving the engine driven pump or during flight should the engine fail or the hydraulic system fail to function. In the trainer, the instructor may simulate the failure of the main hydraulic system by opening the SYS Open key thereby establishing an obvious circuit for the DHS relay 207. Relay 207, upon operating, opens at its back contact the previously traced circuit over which the engine pump signal of phase φ1 was applied through resistor A1 to control conductor 302 of the hydraulic pressure motor control circuit and at its front contact establishes a potential divider circuit extending from the 40φ2 bus-bar, through resistance 231, over the upper No. 4 contacts of the SYS relay 205, over the front contact of relay 207 and to ground through resistance 208. From this potential divider a heavy drain signal of phase φ2 is derived and applied over conductor 209 and through resistor A1 to control conductor 302 whereby the motor 300 is controlled to rotate the shaft 323 back to normal in which position the pressure indicators 119 and 201 will show zero hydraulic pressure.

Now, in order to operate hydraulically controlled mechanisms the pilots must operate the hand pump selector valve to the proper position and use the hand pump. If the SYS Open key at the instructor's desk is operated when the selector valve is in any other position than the SYS position and the SYS relay 205 is released, the operation of the DHS relay 207 will remove the engine pump signal but will not cause the hydraulic pressure motor control circuit to operate in response to a drain signal to reduce the simulated pressure to zero. Consequently, the pilot may use the controls until their operation reduces the simulated pressure to a degree where operation is no longer possible and at which point hand pump operation becomes necessary.

Since the hand pump selector valve handle 105 is moved out of the SYS position, the pilot may build up pressure in the hydraulic system by operating the pump handle 105 through several strokes. Each time that the handle is raised, the cam 106 permits the spring assembly 109 to move to its alternate position thereby establishing a circuit from ground over the contacts of the spring assembly, over conductor 147 and through the winding of the HDP relay 232 to battery and each time the handle is lowered, the cam 106 operates the spring assembly 109 to its other position thereby establishing a circuit from ground over contacts of the assembly, over conductor 148 and to battery through the winding of the HDP1 relay 233. Relays 232 and 233 thus operate in alternation and being slow to release establish a circuit over their lower contacts and through the winding of the HDP2 relay 234 so that relay 234 operates and releases in response to the operation of the pump handle. Relay 234, upon operating, establishes an obvious circuit for the Hand Pump lamp at the instructor's desk to inform the instructor that the pilot has resorted to hand pump operation.

*Hand pump operation of the wing flaps*

It will be assumed that the pilot has operated the hand pump selector valve handle 105 to the WF Only position, for example, to operate the wing flaps to their down position. With the handle 105 in this position, a circuit is established from ground over the contacts of spring assembly 102, over conductor 149 and through the winding of the WF relay 235 to battery. With relay 235 operated, an obvious circuit is established for the Wing Flaps lamp at the instructor's desk to inform the instructor that the pilot is operating the wing flaps by hand pump operation. A potential divider circuit is also established under the control of the HDP2 relay 234 and relay 235 which may be traced from the 40φ1 bus-bar, through resistance 548, over conductor 549, over the upper contacts of relay 234, over the lower back contact of relay 206, over the lower contacts of the WF relay 235, over conductor 236, over the lower front contact of the F relay 130, assuming that the flight is airborne, over the lower contacts of the MP relay 140, which remains operated until the hand pump has created a simulated pressure of over 800 pounds per square inch, and through resistance 150 to ground. A hand pump signal of phase φ1 is derived from this potential divider and applied over conductor 151 and through resistor A2 to control conductor 302 of the hydraulic pressure motor control circuit. In response to this signal the motor 300 turns the shaft 323 in a direction representative of an increasing pressure until, when a pressure of over 800 pounds per square inch is attained, cam 327 permits the switch assembly 333 to open and thereby open the circuit extending thereover and over conductor 350 through the winding of the MP relay 140 to battery. Relay 140 will then release and open the hand pump signal circuit just traced thus stabilizing the pressure at 800 pounds per square inch.

The pilot may now operate the wing flaps control switch 418, for example, to its "down" position thereby causing the operation of the DN relay 533 which causes the lighting of the Wing Flaps Electric Down lamp at the instructor's desk and the operation of the motor 419 of the valve control motor to move the Manual Control 413 into its "down" position to thereby cause the operation of the EDN relay 538 all in the manner previously described. Relay 538 upon operating causes the lighting of the Wing Flaps Manual Down lamp at the instructor's desk and, with the MP relay 140 released representative of the adequate pressure of 800 pounds per square inch to operate the wing flaps, a circuit is established from ground over the middle lower contacts of the HDP2 relay 234 over conductor 132, over the upper back contact of the MP relay 140, over the upper front contact of the F relay 130, over conductor 212, over the upper No. 1 contacts of the WF relay 235, over conductor 531, over the inner upper contacts of relay 538, over contacts of the spring assembly 541 of the indicated air speed motor unit 501 and through the winding of the FD relay 540 to battery. Relay 540 thereupon operates to control the wing flaps motor control circuit 503 and the wing flaps indicator motor unit in the manner previously described.

In response to the operation of the wing flaps indicator motor unit, the indicators 204 and 460 are controlled to show the movement of the wing flaps to their down positions. No wing flaps drain signal is in this case applied to the control conductor 302 of the hydraulic pressure motor control circuit when the FD1 relay 547 operates since the potential divider circuit which would be established upon the operation of relay 547 is opened at the lower No. 2 back contact of the SCO relay 213. Relay 213 was energized upon the first operation of the HDP and HDP1 relays 232 and 233 over a circuit extending from battery through its winding, over the upper No. 3 contacts of the WF relay 235, over the inner lower back contact of the DHL relay 206, and over the upper contacts of relays 233 and 232 to ground, and locked over its upper No. 1 contacts, over the upper No. 2 contacts of the WF relay 235 and to ground at the upper back contact of the DHL relay 206.

To operate the wing flaps while the airplane is on the ground a pressure of only 300 pounds per square inch is necessary and in the trainer when such pressure has been simulated by the operation of the hand pump and the motor 300 has rotated the shaft 323 to a position representative of 300 pounds per square inch, cam 326 permits the LP relay 131 to release and, when relay 538 is operated as previously described in response to the operation of the manual flaps control 413 to the "down" position, the circuit for operating the FD relay of the wing flaps motor control circuit 503 is established from ground over the middle lower contacts of the HDP2 relay 234, over conductor 132, over the lower No. 2 back contact of the LP relay 131, over the upper back contact of the F relay 130, released when the flight is grounded, over conductor 212, over the inner upper contacts of the WF relay 235, over conductor 531, over the inner upper contacts of relay 538, over contacts of spring assembly 541 of the indicated airspeed motor unit and through the winding of the FD relay 540 to battery. The apparatus then functions to simulate the operation of the wing flaps and to indicate the position which they have attained in a manner previously described.

Had the pilot operated the control switch 418 to the "up" position, the apparatus would have functioned in a similar manner to simulate the movement of the wing flaps to their "up" position under the control of the UP relay 514, the EUP relay 519, the FU relay 521, the FU1 relay 528, the HDP2 relay 234, the WF relay 235 and the MP relay 140 or the LP relay 131 as previously described.

Hand pump operation of landing gear

It will now be assumed that the pilot has operated the hand pump selector valve handle 105 to the LG Only position, for example, to retract the landing gear. With the handle 105 in this position, a circuit is established from ground over the contacts of spring assembly 101, over conductor 152 and through the winding of the LG relay 237 to battery. With relay 237 operated an obvious circuit is established over its upper No. 4 contacts for the landing gear Hyd Sel LG lamp at the instructor's desk to inform the instructor that the pilot is operating the landing gear under the control of the hand pump selector valve and hand pump. A potential divider circuit is also established under the control of relay 237 and the HDP2 relay 234 when operated, as previously described, through the operation of the pump handle 107, which circuit may be traced from the 40φ1 bus-bar, through resistance 548, over conductor 549, over the upper contacts of relay 234, over the lower back contact of relay 206, over the lower No. 1 contacts of the LG relay 237, over conductor 238, over the inner upper back contact of the HP1 relay 126 and through resistance 150 to ground. A hand pump signal of phase φ1 is derived from this potential divider and applied over conductor 151 and through resistor A2 to control conductor 302 of the hydraulic pressure motor control circuit.

In response to this signal, the motor 300 turns the shaft 323 in a direction representative of an increasing pressure until when a pressure over 1250 pounds per square inch is attained, cam 328 operates the spring assembly 334 to cause the operation of the HP relay 125 followed by the operation of the HP1 relay 126. Relay 126, upon operating, opens at its inner upper back contact the circuit just traced, over which the hand pump signal was applied to control conductor 302 of the hydraulic pressure motor control circuit and the motor 300 comes to rest, thus stabilizing the simulated pressure at 1250 pounds per square inch.

Since this pressure is adequate for the operation of the landing gear, the pilot may simulate the retraction of the landing gear by the operation of the control handle 405 to its "up" position if, as it will be assumed, the handle has been unlocked by the solenoid 412 responsive to a simulated airborne flight. The operation of the handle 405 to its "up" position establishes the circuit of the LGR relay 220 as previously described which causes the lighting of the Landing Gear Retract lamp at the instructor's desk to inform the instructor that the pilot is retracting the landing gear.

Upon the first stroke of the hand pump and the consequent operation of the HDP and HDP1 relays 232 and 233, the circuit of the SCO relay 213 is established and such relay, upon operating, locks over its upper No. 1 contacts, over the upper No. 3 contacts of the LG relay 237 and to ground at the upper back contact of the DHL relay 206 and prevents the application of a landing gear drain signal to the hydraulic pressure motor control circuit as will be later described.

As a further result of the operation of the LG relay 237 and the LGR relay 220, a circuit is established from ground, over the middle lower contacts of the HDP2 relay 234, over the upper No. 1 contacts of relay 237, over the lower No. 1 contacts of relay 220, over the inner upper contacts of relay 234, over conductor 162, over the lower No. 2 contacts of the HP relay 125, now operated since it has been assumed that through hand pump operation pressure of 1250 pounds per square inch has been attained, over conductor 133, over the contacts of the L1 limit switch in its released position and through the right shaded pole winding of the motor 428 of the landing gear motor unit to ground. The motor 428 now operates to turn shaft 430 in a direction representative of the retraction of the landing gear which retraction is indicated by the indicators 204 and 460 are previously described. The circuits concerned with the retraction of the landing gear now function in the manner previously described in connection with the landing gear retraction under the hydraulic system control.

Since relay 466 is not operated under hand pump operation, the circuit previously traced from the 40φ2 bus-bar, over conductor 532, through resistance 455, over the upper inner contacts of relay 466, over conductor 467, over the upper back contact of relay 141 and through resistance 142 to ground, is not established and no drain signal is applied to the hydraulic pressure motor control circuit to simulate the reduction in hydraulic pressure incident to the retraction of the landing gear. Consequently, the simulated pressure does not fall below 1250 pounds per square inch.

To lower the landing gear by hand pump operation the simulated hydraulic pressure is increased to 1250 pounds per square inch by hand pump operation as previously described and the control handle 405 is operated to its "down" position thereby causing the operation of the LGL relay 226.

With relay 226 operated a circuit is established from ground over the lower middle contacts of the HDP2 relay 234, over the upper No. 1 contacts of the LG relay 237, over the upper No. 1 contacts of the LGL relay 226, over conductor 221, over the upper No. 3 contacts of the HP relay 125, over the upper back contact of the HS relay 145, over conductor 146, over the contacts of limit switch L2 and through the left shaded pole winding of motor 428 to ground. The motor functions in the manner previously described and when the shaft 430 reaches the limit of its movement, limit switch L2 operates to stop the motor and to cause the operation of relay 434.

Relay 226, upon operating, attempts to establish the potential divider extending from the 40φ2 bus-bar, over conductor 532, through resistance 455, over the lower back contact of relay 434, until the landing gear is fully extended, over conductor 456, over the upper No. 1 contacts of the HP relay 125, through resistance 135, over the lower back contact of the UNV relay 123, over conductor 134, over the lower No. 2 contacts of relay 237, over the upper No. 3 back contact of the SCO relay 213, over the lower No. 2 contacts of the LGL relay 226 and through resistance 223 to ground, but this circuit is open at the upper No. 3 back contact of the SCO relay 213 which operated as previously described in response to the first stroke of the hand pump. Consequently no drain signal is applied through resistor A6 to the hydraulic pressure motor control circuit and the simulated hydraulic pressure does not fall below 1250 pounds per square inch.

*Hand pump operation of cowl flaps*

It will now be assumed that the pilot has operated the hand pump selector valve handle 105 to the GC—CF—WL position, for example, to close the cowl flaps. With the handle in this position a circuit is established from ground over the contacts of spring assembly 103, over conductor 153 and through the winding of the GC relay 239 to battery. Relay 239, upon operating, establishes an obvious circuit from ground over its upper No. 4 contacts and through the Gun Charge lamp at the instructor's desk to battery to inform the instructor that the pilot is using the hand pump to control either the guns, the cowl flaps or the wing locking pins. The pilot will also operate the cowl flaps control 400 to its "close" position thereby establishing the previously traced circuit for the motor 424 of the cowl flaps motor unit to simulate the operation of the cowl flaps to their closed position. However, until the simulated hydraulic pressure has been built-up above 300 pounds per square inch by the operation of the hand pump, the cowl flaps control is ineffective to control the motor 424 because the LP relay 131 will be energized under the control of cam 326 on shaft 323 of the hydraulic pressure motor control circuit and will hold the CO relay 437 of the cowl flaps motor unit operated to prevent the operation of the C relay 458 to close the circuit of motor 424. The circuit of the CO relay 437 may be traced from battery through its winding, over conductor 472 and to ground over the upper No. 2 front contact of the LP relay 131.

In response to the operation of the hand pump handle 107, the HDP and HDP1 relays 232 and 233 operate in alternation and the HDP2 relay 234 will repeatedly operate and release as previously described. Relay 234, upon its first operation, will establish the circuit of the SCO relay 213 as previously described whereupon relay 213 will operate and lock over its upper No. 1 contacts, over the upper No. 2 contacts of the GC relay 239 and to ground at the upper back contact of the DHL relay 206. Until a simulated pressure greater than 300 pounds per square inch is attained, each operation of the HDP2 relay 234 establishes a potential divider circuit which may be traced from the 40φ1 bus-bar, through resistance 548, over conductor 549, over the upper contacts of relay 234, over the lower back contact of relay 206, over the lower No. 3 contacts of the GC relay 239, over conductor 240, over the upper back contact of the CF relay 127, over the lower contacts of the MP relay 140, which will be operated with the simulated pressure below 800 pounds per square inch, and through resistance 150 to ground from which potential divider a hand pump signal is applied over conductor 151 and through resistor A2 to control conductor 302 of the hydraulic pressure motor control circuit. In response to this hand pump signal, the motor 300 will turn the shaft 323 in a direction representative of an increase in pressure.

As soon as the shaft 323 has been rotated to a position representative of a pressure greater than 300 pounds per square inch, cam 326 opens the circuit of the LP relay 131 which releases and in turn places the CO relay 437 under the control of the HDP2 relay 234 to render the C relay 458 of the cowl flaps motor unit responsive to the cowl flaps control 400 assumed to have been operated to its "close" position whereupon the motor 424 is operated in simulation of the closing of the cowl flaps and a circuit is established from ground over the lower contacts of relay 458 and over conductor 441 through the winding of the CF relay 127 to battery. Relay 127, upon operating, now opens the previously traced potential divider circuit to remove the hand pump signal from control conductor 302 of the hydraulic pressure motor control circuit.

With the LP relay 131 now deenergized the next time that the HDP2 relay 234 releases during the operation of the hand pump a circuit is established from ground over the lower back contact of relay 234, over the lower No. 4 contacts of the SCO relay 213, over the lower No. 1 contacts of the GC relay 239, over conductor 241, over the upper back contact of the LP relay 131, over conductor 472 and through the winding of the CO relay 437 of the cowl flaps motor unit so that relay 437 now operates and releases the C relay 458 to stop the motor 434 and to release the CF relay 127. Relay 127 upon releasing again reestablishes the potential divider circuit from which the hand pump signal was derived and applied to the control conductor 302 of the hydraulic pressure motor control circuit as soon as the HDP2 relay 234 again operates. On the next release of relay 234, relay 437 again operates to permit the response of the cowl flaps motor 424 and to reoperate relay 127 which again opens the potential divider circuit to stop the application of the hand pump signal. Thus the motor 424 is operated intermittently until the shaft 426 controlled thereby has moved to a position representative of the full closed position of the cowl flaps. This simulates the step-by-step closure of the cowl flaps under hand pump operation in an actual airplane.

*Gun charging under hand pump operation*

For gun charging under hand pump operation, the hand pump selector valve handle 105 is moved to the GC—CF—WL position thereby causing the operation of the GC relay 239 as previously described. The CF relay 127 does not become operated at this time since the cowl flaps control 400 is not operated. Therefore, in response to the operation of the HDP, HDP1 and HDP2 relays 232, 233 and 234, the potential divider circuit previously traced over the lower contacts of the MP relay 140 is maintained until the motor 300 of the hydraulic pressure motor control circuit has rotated the shaft 323 into a position representative of a pressure above 800 pounds per square inch and the MP relay 140 becomes released through the operation of cam 327. When relay 140 releases, it establishes a circuit which may be traced from ground over its inner upper back contact, over conductor 154, over the upper No. 3 contacts of the GC relay 239, over conductor 155 and to battery through the winding of the H—P relay 156 of the gun charger circuit. The operation of this relay as fully described in the application of R. B. Buchanan hereinbefore referred to is necessary for the initial charging or safetying of the guns. The gun charging drain potential of the phase $\varphi 2$ derived by the operation of the RLS relay 136 is not cut off by the operation of the SCO relay 213 so that the hydraulic motor control circuit will be operated representative of a slight drop in pressure each time that a gun charger knob is depressed for charging or safetying the guns.

As previously stated, it may be desirable to operate the hydraulically operated mechanisms of an airplane while it is on the ground and the engine is not running. For this purpose the hand pump selector valve is placed in the SYS position and the hand pump is operated. With the valve handle 105 in the SYS position the SYS relay 205 is operated as previously described. The instructor's controls must be normal and the wing flaps control switch 418 or hand control 413 must be in the "up" position thereby causing the operation of the EUP relay 519 as previously described. Under these conditions when the hand pump is operated and the HDP, HDP1 and HDP2 relays 232, 233 and 234 are operated, a potential divider circuit is established which may be traced from the $40\varphi 1$ bus-bar, through resistance 548, over conductor 549, over the upper contacts of the HDP2 relay 234, over the lower contacts of the DHL relay 206, through the 10,000-ohm resistance 242, over the lower No. 2 contacts of the SYS relay 205, over conductor 157 and through resistance 159 to ground from which potential divider a hand pump signal of phase $\varphi 1$ is derived and applied over conductor 151 and through resistor A2 to the hydraulic pressure motor control circuit. This signal will be lower than the hand pump signal previously considered to represent the slow build-up of pressure by the hand pump when pressure is being supplied therefrom to the whole hydraulic system rather than over an individual line to hydraulically operated equipment when the hand pump selector valve is operated to one of its other selection positions.

*Disabling the hydraulic system*

The instructor may completely disable the hydraulic system by operating the Line Open key thereby causing the operation of the DHL relay 206. Upon operating relay 206 opens at its lower back contact a point in the previously traced potential divider circuit from which a hand pump signal of phase $\varphi 1$ was derived and applied to the hydraulic pressure motor control circuit, and establishes a potential divider circuit extending from the $40\varphi 2$ bus-bar through resistance 231, over the upper front contact of relay 206, over the upper back contact of the DHS relay 207 and through resistor 208 to ground from which a drain signal is applied over conductor 209 and through resistor A1 to the hydraulic pressure motor control circuit thereby driving the motor 300 in its pressure decreasing direction in simulation of a hydraulic leak. Relay 206 at its inner lower back contact opens the operating circuit and at its upper back contact opens the locking circuit of the SCO relay 213 so that such relay may not be operated and locked.

*Emergency landing gear dump air pressure system*

As previously stated, this dump air pressure system in an airplane consists of a compressed air bottle and associated valves and connections to the landing gear hydraulic cylinders. It can only be used for lowering the landing gear and is normally never used unless the regular and auxiliary hydraulic pressure systems fail.

In the trainer the compressed air bottle valve is represented by the switch assembly 116 which is in the open position so long as the compressed air bottle valve control is closed. Under this condition the dump air pressure (DAP) relay 343 is released and the zero pounds per square inch synchrotransmitter 337 is connected with the synchroreceivers 120 and 202 as previously described. The transmitter 337 is so adjusted that under this condition the receivers 120 and 202 will operate the associated dump air pressure indicators 121 and 203 at the pilot's and instructor's instrument panels to read zero pressure. To check the bottle pressure, the pilot opens the valve 115 associated with the mock-up 114 of the air bottle, thereby permitting the switch 116 to close and establish a circuit from ground thereover, over the lower No. 3 back contact of the EL1 relay 243 and over conductor 244 through the winding of the DAP relay 343 to battery. Relay 343 thereupon operates to disconnect the synchroreceivers 120 and 202 from the synchrotransmitter 337 and to connect them with the synchrotransmitter 338 which transmitter is so adjusted as to cause the receivers 120 and 202 to set the dump air pressure indicators 121 and 203 to read 1800 pounds per square inch pressure.

To lower the landing gear under air pressure control from the air bottle, the pilot operates the emergency landing gear control 110 thereby closing the contacts of switch assembly 113 to establish a circuit from ground thereover, over conductor 158 and through the winding of the EL relay 222 to battery. Relay 222 thereupon operates to establish over its lower contacts an obvious circuit for the EL1 relay 243 which operates and locks over the lower contacts of the locking ground release (LK) relay 245. Relay 222 also establishes over its inner upper contacts an obvious circuit for the Emer-Lowering lamp at the instructor's desk to inform the instructor that the pilot has resorted to the use of the emergency landing gear control. At its upper back contact relay 222 opens the circuit of the LGR relay 220 so that it will be possible for the pilot to make an emergency lowering of the landing gear, regardless of the position of the regular landing gear control.

Relay 243 at its lower No. 3 back contact opens the circuit of the DAP relay 343 and establishes a circuit from ground over the normal contacts of the dump pressure cut-off key 246 at the instructor's desk, over its lower No. 1 contacts, over conductor 247, over the upper back contact of HS1 relay 159, over the upper back contact of the HS relay 145, if the air speed is not greater than 140 knots and relays 159 and 145 have not operated, thence over conductor 146 and over the contacts of limit switch L2 to ground through the left shaded pole winding of the motor 428. The motor 428 thereupon operates to turn shaft 430 in a direction representative of the lowering of the landing gear wheels to their full down position in which position the LGD relay 434 operates. The indicators 204 and 460 are controlled by the potentiometers 431, 432 and 433 and by the relay 434 to indicate the full down and locked positions of the landing gear wheels as previously described.

High speed cut off

If an attempt is made to lower the landing gear by any method at an air speed in excess of 140 knots the landing gear will not operate because the circuit for controlling the motor 428 will be opened by the operation of the HS and HS1 relays 145 and 159. The circuit of relay 145 may be traced from battery through its winding over conductor 160 and to ground over contacts of the spring assembly operated by cam 550 of the indicated air speed motor unit 501 when the air speed is greater than 140 knots. Relay 145 upon operating opens the operating circuit over conductor 146 for controlling the motor 428 and establishes an obvious circuit for the HS1 relay 159 which also opens the circuit over conductor 146 and locks over conductor 161 to ground over the lower No. 2 contacts of the EL1 relay 243 if such relay has operated, thus if the lowering operation of the landing gear is being performed by the emergency system and relay 243 is operated, relay 159 is locked up and even though the air speed should thereafter be reduced below 140 knots and relay 145 be released, the landing gear could not be lowered all the way down. However, if the lowering is being done by the hydraulic or auxiliary hydraulic system it may be lowered all the way down since relays 145 and 159 were both released after the air speed is reduced below 140 knots.

Disabling

The instructor may prevent regular hydraulic system operation by closing the SYS Open key as previously described and may prevent auxiliary hydraulic system operation by closing the Line Open key as previously described. To disable the emergency landing gear system, the instructor operates the Dump Press Cut Off Key 246 to the "off" position thereby preventing the EL1 relay 243 from establishing the circuit for operating the motor 428 of the landing gear motor unit. If relay 243 has been operated and locked, it may be released when the instructor upon the completion of the training session restores all operated relays of the trainer to normal by the operation of the LK relay 245 through the operation of the key 248.

The instructor may disable the electrohydraulic wing flaps control system by opening the Cut Off key or by causing the BKR relay 515 to release thereby removing battery by which the valve control motor 419 is run under control of the electrohydraulic control switch 418. The wing flaps may then be controlled by the manual control handle 413.

Automatic operation of the wing flaps

If the wing flaps are down and the air speed exceeds 100 knots, the variac 552 of the indicated air speed motor unit will apply an air speed signal from the slider of the variac 552 through resistor 551 to the control conductor 525 of the wing flaps motor control circuit 503 which will overcome the signal applied through resistor 544 and the motor of the circuit 503 will run until the sum of the signal through resistor 544 and the balancing signal applied through resistor 545 equals the air speed signal. The potential derived from the slider of variac 552 is produced by the energization of the winding of variac 552 over a circuit from the $40\varphi2$ bus-bar, over the contacts of the AS relay 553 and through the winding of the variac to ground after the relay 553 operates indicative of an air speed. The air speed effect increases as the air speed increases and at 170 knots the wing flaps motor unit shaft 526 will assume a position representative of a 20-degree deflection. During this speed range the flaps indicator motor unit remains in a position representative of the "down" position of the wing flaps. However, as soon as the air speed exceeds 170 knots the switch assembly 541 of the indicated air speed unit releases thereby releasing the FD relay 540 and causing the FU relay 521 to operate even though the controls 418 and 413 are in their "down" positions. Relay 521, upon operating, removes the balancing potential applied from the balancing potentiometer 527 and applies a signal of phase $\varphi2$ through resistor 524 which is in phase with the air speed signal derived from the variac 552 and the motor of the control circuit 503 thereupon operates the shaft 526 to the position representing the upper position of the wing flaps. Relay 521 also causes the wing flaps indicator motor circuit to operate in the manner previously described to cause the indicators 204 and 460 to show the full up position of the wing flaps. This simulates the movement of the wing flaps resulting from the high speed movement of the airplane through the air.

What is claimed is:

1. In an aircraft trainer for flight personnel, means for simulating the operation of the engine of an airplane, a source of current, a control conductor, means controlled by said first means for deriving a potential from said source and for applying it to said conductor in simulation of the application of hydraulic pressure to the hydraulic system of said airplane by an engine driven pump, a motor responsive to said potential, a shaft driven by said motor to positions representative of simulated hydraulic pressures, relay means for removing said potential from said conductor to arrest the operation of said motor when said shaft has been rotated to a position representative of a definite pressure in simulation of the operation of the unloader valve of an airplane which limits the build-up of pressure by the engine driven pump, and cam operated switches operable by said shaft to control said relay means.

2. In an aircraft trainer for flight personnel, means for simulating the operation of the engine of an airplane, a source of current, a control conductor, means controlled by said first means for deriving a potential from said source and for applying it to said conductor in simulation of the application of hydraulic pressure to the hydraulic system of said airplane by an engine driven pump, a motor responsive to said potential, a shaft driven by said motor to positions representative of simulated hydraulic pressures, a first relay operable when said shaft has been rotated to a position representative of an adequate hydraulic pressure, a second relay operable to remove said potential from said conductor to arrest said motor when said shaft has been rotated to a desired maximum pressure position in simulation of the opening of the unloader valve of an airplane which limits the build-up of pressure by the engine driven pump, and a locking circuit for said latter relay controlled by said first relay, said latter relay releasing to reapply said potential to said control conductor when said shaft is rotated back to a position representative of a decrease in pressure below said adequate pressure in simulation of the reclosure of said unloader valve.

3. In an aircraft trainer for flight personnel, means for simulating the operation of the engine of an airplane, a source of current, a control conductor, means controlled by said first means for deriving a potential from said source and for applying it to said conductor in simulation of the application of hydraulic pressure to the hydraulic system of said airplane by an engine driven pump, a motor responsive to said potential, a shaft driven by said motor to positions representative of simulated hydraulic pressures, a first cam operated switch operable by said shaft when said shaft has been rotated to positions representative of pressures above an adequate pressure, a second cam operated switch operable by said shaft when said shaft has been rotated to positions representative of pressures above a desired maximum pressure, a first relay operable by said first switch, a second relay operable by said second switch to remove said potential from said conductor to arrest said motor in simulation of the opening of the unloader valve of an airplane which limits the build-up of pressure by the engine driven pump, and a locking circuit for said latter relay controlled by said first relay, said latter relay releasing to reapply said potential to said control conductor upon the release of said first relay when said shaft has rotated back to a position representative of a decrease in pressure below said adequate pressure in simulation of the reclosure of said unloader valve.

4. In an aircraft trainer for flight personnel, means for simulating the operation of the engine of an airplane, a source of current, a control conductor, means controlled by said first means for deriving a potential from said source and for applying it to said conductor in simulation of the application of hydraulic pressure to the hydraulic system of said airplane by an engine driven pump, means for simulating the control and operation of the hydraulically operated mechanisms of said airplane, means responsive to said latter means for deriving potentials from said source and for applying them to said conductor representative of the reduction of the pressure in the hydraulic system of an airplane incident to the operation of said mechanisms, a motor responsive to the summation of the potentials applied to said conductor, an instructor's desk, and instruments in the cockpit of said trainer and at said desk operable by said motor for indicating the instant simulated hydraulic pressure in said system.

5. In an aircraft trainer for flight personnel, means for simulating the operation of the engine of an airplane, a source of current, a control conductor, means controlled by said first means for deriving a potential from said source and for applying it to said conductor in simulation of the application of hydraulic pressure to the hydraulic system of said airplane by an engine driven pump, means for simulating the control and operation of the hydraulically operated mechanisms of said airplane, a switch selectively operable in simulation of the hand pump selector valve of an airplane and operative when set into one position for rendering any of said control means effective, means responsive to said control means for deriving potentials from said source and for applying them to said conductor representative of the reduction of the pressure in the hydraulic system of an airplane incident to the operation of said mechanisms, a motor responsive to the summation of the potentials applied to said conductor, an instructor's desk, and instruments in the cockpit of said trainer and at said desk operable by said motor for indicating the instant simulated hydraulic pressure in said system.

6. In an aircraft trainer for flight personnel, means for simulating the operation of the engine of an airplane, a source of current, a control conductor, means for deriving a potential from said source and for applying it to said conductor in simulation of the application of hydraulic pressure to the hydraulic system of said airplane by an engine driven pump, means for simulating the hydraulically operated mechanism for charging and safetying the guns of an airplane, means responsive to said latter means for deriving a drain potential from said source and for applying it to said conductor representative of the reduction of the pressure in the hydraulic system incident to the charging or safetying of the guns, a motor responsive to the summation of the potentials applied to said conductor, a shaft driven by said motor, a relay for rendering said gun charging and safetying means operative, and a cam operated switch operable by said shaft to cause the operation of said relay when said shaft has been rotated to a position representative of the pressure at which the gun charging and safetying mechanism of an airplane would be operable.

7. In an aircraft trainer for flight personnel, means for simulating the operation of the engine of an airplane, a source of current, a control conductor, means for deriving a potential from said source and for applying it to said conductor in simulation of the application of hydraulic pressure to the hydraulic system of said airplane by an engine driven pump, means for simulating the hydraulically operated mechanism for opening or closing the engine cowl flaps of an airplane, means responsive to said latter means for deriving a drain potential from said source and for applying it to said conductor representative of the reduction of pressure in the hydraulic system incident to the opening or closing of said cowl flaps, a motor responsive to the summation of the potentials applied to said conductor, a shaft driven by said motor, a relay for rendering said means for simulating the cowl flaps operating mechanism inoperative, and a cam operated switch operable by said shaft to cause the operation of said relay when said shaft has been rotated to a position representative of a pressure too low for operating the cowl flaps operating mechanism of an airplane.

8. In an aircraft trainer for flight personnel, means for simulating the operation of the engine of an airplane, a source of current, a control conductor, means for deriving a potential from said source and for applying it to said conductor in simulation of the application of hydraulic pressure to the hydraulic system of said airplane by an engine driven pump, means for simulating the hydraulically operated mechanism for opening or closing the engine cowl flaps of an airplane, means responsive to said latter means for deriving a drain potential from said source and for applying it to said conductor representative of the reduction of the pressure in the hydraulic system incident to the opening and closing of said cowl flaps, a motor responsive to the summation of the potentials applied to said conductor, a shaft driven by said motor to positions representative of simulated hydraulic pressures, and relay means for removing said pump potential from said conductor to cause the reversal of said motor when said shaft has been rotated to a position representative of a maximum pressure and releasable for reapplying said pump potential when said shaft has been rotated back to a position representative of the reduced pressure incident to the simulated operation of said mechanism, said relay means being operable through one or more cycles until said cowl flaps simulating mechanism is fully operated and said drain potential is removed from said conductor.

9. In an aircraft trainer for flight personnel, means for simulating the operation of the engine of an airplane, a source of current, a control conductor, means for deriving a potential from said source and for applying it to said conductor in simulation of the application of hydraulic pressure to the hydraulic system of said airplane by an engine driven pump, a reversible motor for simulating the hydraulically operated mechanism for opening or closing the engine cowl flaps of an airplane, a switch operable in simulation of the cowl flaps control valve for causing said motor to operate in one direction to simulate the opening of the cowl flaps and to operate in the other direction to simulate the closing of the cowl flaps, a relay operable during the operation of said motor in either direction for causing the derivation of a drain potential from said source and for applying it to said conductor representative of the reduction of the pressure in the hydraulic system incident to the opening or closing of said cowl flaps, a motor responsive to the summation of the potentials applied to said conductor, a shaft driven by said latter motor, a relay for rendering the control of said first motor by said control switch ineffective and a cam operated switch operable by said shaft to cause the operation of said latter relay when said shaft has been rotated to a position representative of a pressure too low for operating the cowl flaps operating mechanism of an airplane.

10. In an aircraft trainer for flight personnel, means for simulating the operation of the engine of an airplane, a source of current, a control conductor, means for deriving a potential from said source and for applying it to said conductor in simulation of the application of hydraulic pressure to the hydraulic system of said airplane by an engine driven pump, means for simulating the hydraulically operated mechanism for raising and lowering the wing flaps of an airplane, an instructor's desk, instruments in the cockpit of the trainer and at said desk for indicating the up or down position of said flaps, means responsive to said latter means for controlling said instruments and for causing the derivation of a drain potential from said source and the application thereof to said conductor representative of the reduction of the pressure in the hydraulic system incident to the raising or lowering of said wing flaps, a motor responsive to the summation of the potentials applied to said conductor, a shaft driven by said motor, a relay for rendering said means for simulating the wing flaps operating mechanism inoperative and a cam operated switch operable by said shaft to cause the operation of said relay when said shaft has been rotated to a position representative of a pressure too low for operating the wing flaps operating mechanism of an airplane.

11. In an aircraft trainer for flight personnel, means for simulating the operation of the engine of an airplane, a source of current, a control conductor, means for deriving a potential from said source and for applying it to said conductor in simulation of the application of hydraulic pressure to the hydraulic system of said airplane by an engine driven pump, means for simulating the hydraulically operated mechanism for raising and lowering the wing flaps of an airplane, means responsive to said latter means for causing the derivation of a drain potential from said source and the application thereof to said conductor representative of the reduction of the pressure in the hydraulic system incident to the raising or lowering of said wing flaps, a motor responsive to the summation of the potentials applied to said conductor, a shaft driven by said motor, a first relay operable when an airborne condition of flight is being simulated, a second relay operable by a shaft operated switch when said shaft has been rotated to a position representative of a low pressure, a third relay operable by a shaft operated switch when said shaft has been rotated to a position representative of a medium pressure and a control circuit for said wing flaps simulating means effective if said first and second relays are both unoperated simulating the operable condition of the wing flaps mechanism of an airplane by low pressure if the airplane is on the ground and effective if said first relay is operated and said third relay is unoperated simulating the operable condition of the wing flaps mechanism if the airplane is in flight.

12. In an aircraft trainer for flight personnel, means for simulating the operation of the engine of an airplane, a source of current, a control conductor, means for deriving a potential from said source and for applying it to said conductor in simulation of the application of hydraulic pressure to the hydraulic system of said airplane by an engine driven pump, means for simulating the hydraulically operated mechanism for raising and lowering the wing flaps of an airplane, an instructor's desk, instruments in the cockpit of the trainer and at said desk for indicating the up or down position of said flaps, means responsive to said latter means for controlling said instruments and for causing the derivation of a drain potential from said source and the application thereof to said conductor representative of the reduction of the pressure in the hydraulic system incident to the raising or lowering of the wing flaps, a motor responsive to the summation of the potentials applied to said conductor, a shaft driven by said motor to positions representative of simulated hydraulic pressures, and relay means for removing said pump potential from said conductor to cause the reversal of said motor when said shaft has been rotated to a position representative of a maximum pressure and releasable for reapplying said pump potential when said shaft has been rotated back to a position representative of the reduced pressure incident to the simulated operation of said mechanism, said relay being operable through one or more cycles until said wing flaps simulating mechanism is fully operated and said drain potential is removed from said conductor.

13. In an aircraft trainer for flight personnel, means for simulating the operation of the engine of an airplane, a source of current, a control conductor, means for deriving a potential from said source and for applying it to said conductor in simulation of the application of hydraulic pressure to the hydraulic system of said airplane by an engine driven pump, means for simulating the hydraulically operated mechanism for raising and lowering the wing flaps of an airplane, a control operable to an up or to a down position for controlling said latter means, a motor responsive to the potential applied to said conductor, a shaft driven by said motor, a relay controllable by a shaft operated switch to render said latter means responsive to said control when said shaft has been rotated to a position representative of a hydraulic pressure adequate to operate the wing flaps operating mechanism of an airplane, an instrument for indicating the up or down position of said flaps, means responsive to the means which simulates the flaps operating mechanism for controlling said instrument, means for simulating the indicated air speed of a simulated flight, and means operated by said indicated air speed simulating means when the air speed of a simulated flight exceeds a definite value for operating said means which simulates the flaps operating mechanism to cause said instrument to indicate the up position of the flaps regardless of the position to which said control has been set in simulation of the movement of the wing flaps of an airplane to the up position incident to the pressure of the slip stream on the flaps.

14. In an aircraft trainer for flight personnel, means for simulating the operation of the engine of an airplane, a source of current, a control conductor, means for deriving a potential from said source and for applying it to said conductor in simulation of the application of hydraulic pressure to the hydraulic system of said airplane by an engine driven pump, means for simulating the hydraulically operated mechanism for raising and lowering the wing flaps of an airplane, a control for controlling said latter means, a motor responsive to the potential applied to said conductor, a shaft driven by said motor, a relay controllable by a shaft operated switch to render said latter means responsive to said control when said shaft has been rotated to a position representative of a hydraulic pressure adequate to operate the wing flaps operating mechanism of an airplane, an instrument for indicating the position of said flaps, means for simulating the indicated air speed of a simulated flight, means operated by said indicated air speed simulating means when the air speed of a simulated flight is lower than a definite value for permitting the operation of said means which simulates the flaps operating mechanism, and means controlled by said means which simulates the flaps operating mechanism for controlling said instrument to indicate the lowering of the flaps to their full down position.

15. In an aircraft trainer for flight personnel, means for simulating the operation of the engine of an airplane, a source of current, a control conductor, means for deriving a potential from said source and for applying it to said conductor in simulation of the application of hydraulic pressure to the hydraulic system of said airplane by an engine driven pump, means for simulating the hydraulically operated mechanism for raising and lowering the wing flaps of an airplane, a control for controlling said latter means, a motor responsive to the potential applied to said conductor, a shaft driven by said motor, a relay controllable by a shaft operated switch to render said latter means responsive to said control when said shaft has been rotated to a position representative of a hydraulic pressure adequate to operate the wing flaps operating mechanism of an airplane, an instrument for indicating the position of said flaps, means for simulating the indicated air speed of a simulated flight, means operated by said indicated air speed simulating means when the air speed of a simulated flight is above a definite value but not greater than a definite higher value for permitting the operation of said means which simulates the flaps operating mechanism to assume a position representative of a part down position of said flaps, which position varies with the simulated air speed, and means controlled by said means which simulates the flaps operating mechanism for controlling said instrument to indicate the position of said flaps.

16. In an aircraft trainer for flight personnel, means for simulating the operation of the engine of an airplane, a source of current, a control conductor, means for deriving a potential from said source and for applying it to said conductor in simulation of the application of hydraulic pressure to the hydraulic system of said airplane by an engine driven pump, means for simulating the hydraulically operated mechanism for raising and lowering the wing flaps of an airplane, a manual control operable to control said latter means, a reversible motor operable to operate said manual control, a switch operable to one position to cause said motor to operate said control to a position for controlling said latter means to simulate the raising of the wing flaps and operable to a second position to cause said motor to operate said controls to a position for controlling said latter means to simulate the lowering of the wing flaps, a motor responsive to the potential applied to said conductor, a shaft driven by said motor and a relay controllable by a shaft operated switch to render said latter means responsive to said control when said shaft has been rotated to a position representative of a hydraulic pressure adequate to operate the wing flaps operating mechanism of an airplane.

17. In an aircraft trainer for flight personnel, a source of current, a control conductor, means for deriving a potential from said source and for applying it to said conductor, means operative in response to the application of potential to said conductor to simulate the production of a hydraulic pressure in the hydraulic system of an airplane, means for simulating the hydraulically operated mechanism for retracting and lowering the landing wheels of an airplane, an instructor's desk, instruments in the cockpit of the trainer and at said desk for indicating the up or down positions of said wheels, means responsive to said latter means for controlling said instruments and for causing the derivation of a drain potential from said source and the application thereof to said conductor representative of the reduction of the pressure in the hydraulic system incident to the retraction or lowering of said landing wheels, a motor responsive to the summation of the potentials applied to said conductor, a shaft driven by said motor, a relay for rendering said means for simulating the landing wheel operating mechanism operative, and a cam operated switch operable by said shaft to cause the release of said relay when said shaft has been rotated to a position representative of a pressure too low for operating the landing wheels operating mechanism of an airplane.

18. In an aircraft trainer for flight personnel, means for simulating the hydraulically operated mechanism for retracting and lowering the landing wheels of an airplane, means for simulating the production of a hydraulic pressure, a simulated landing gear control for controlling said first means, means operated by said hydraulic pressure simulating means for rendering said control effective to control said means for simulating the hydraulically operated mechanism if a hydraulic pressure adequate to operate said mechanism has been simulated, an instructor's desk, instruments in the cockpit of the trainer and at said desk for indicating the position of said landing wheels, telemetric means operable by said first means which simulates the hydraulically operated mechanism for controlling said instruments and means operative by said means which simulates the hydraulically operated mechanism when the fully retracted or fully lowered position of the landing wheels has been simulated for further controlling said instruments to indicate the locked condition of said landing wheels in either the retracted or lowered positions.

19. In an aircraft trainer for flight personnel, means for simulating the hydraulically operated mechanism for retracting and lowering the landing wheels of an airplane, means for simulating the production of a hydraulic pressure adequate to operate said mechanism, means for controlling said first means and rendered effective if a hydraulic pressure adequate to operate said mechanism has been simulated, means for simulating the indicated air speed of a simulated flight, means operated by said indicated air speed simulating means when the air speed of a simulated flight exceeds a definite value for rendering said first means ineffective to simulate the lowering of said landing wheels until said simulated air speed becomes reduced below said definite value.

20. In an aircraft trainer for flight personnel, a source of current, a control conductor, means for deriving a potential from said source and for applying it to said conductor, means operative in response to the application of potential to said conductor to simulate the production of a hydraulic pressure in the hydraulic system of an airplane, means for simulating the hydraulically operative mechanism for retracting and lowering the landing wheels of said airplane, means operative when said latter means is controlled in simulation of the retraction of the landing wheels to derive a heavy drain potential from said source and to apply said potential to said conductor in simulation of the rapid lowering of the pressure in the hydraulic system of an airplane due to the rapid upward movement of the landing wheels because of the action of the slip stream, means for arresting the operation of said means which simulates the landing wheel operating mechanism when the partial retraction of the landing wheels has been simulated, means responsive to the summation of the potentials applied to said conductor when the simulated pressure reaches a predetermined low value to remove said drain potential whereupon said first potential is effective to cause the simulation of an increase in hydraulic pressure, and means operative when the simulated pressure has increased to a predetermined amount to control the operation of the means which simulates the landing wheels operating mechanism to a position representative of the fully retracted position of the landing wheels and to apply a reduced drain potential to said conductor.

21. In an aircraft trainer for flight personnel, means for simulating the hydraulically operated mechanism for retracting and lowering the landing wheels of an airplane, means for simulating the indicated air speed of a simulated flight, means for simulating the emergency landing wheels control of an airplane, means operated in response to said control for causing the operation of said first means in a manner representative of the lowering of the landing wheels by air pressure applied from the air bottle which is provided for applying air pressure for lowering the landing wheels in the event of the failure of the hydraulic system of an actual airplane, and means operated by said air speed simulating means for rendering said latter means ineffective if the air speed of the simulated flight is too high whereby the retarding effect of the slip stream on the lowering of the landing wheels of an airplane is simulated.

22. In an aircraft trainer for flight personnel, means for simulating the emergency air bottle of an airplane which is available for supplying air pressure for lowering the landing wheels in the event of a failure of the hydraulic systems of the airplane, an instructor's desk, pressure indicators in the cockpit of said trainer and at said desk, telemetric receivers associated with said instruments for causing the operation thereof, a first telemetric transmitter settable to control said receivers for setting said instruments to read a zero pressure, a second telemetric transmitter settable to control said receivers for setting said instruments to read the maximum air pressure of the air bottle, and a relay operable in response to the opening of the valve of the air bottle simulating means for transferring said receivers from said first transmitter to said second transmitter.

23. In an aircraft trainer for flight personnel, means for simulating the hydraulically operated mechanism for retracting and lowering the landing wheels of an airplane, means for simulating the emergency air bottle of an airplane which is available for supplying air pressure for lowering the landing wheels in the event of a failure of the hydraulic systems of the airplane, an instructor's desk, pressure indicators in the cockpit of said trainer and at said desk, telemetric receivers associated with said instruments for causing the operation thereof, a first telemetric transmitter settable to control said receivers for setting said instruments to read zero pressure, a second telemetric transmitter settable to control said receivers for setting said instruments to read the maximum air pressure of said air bottle, a relay operable in response to the opening of the valve of said air bottle simulating means for transferring said receivers from said first transmitter to said second transmitter, means for simulating the emergency landing wheels control of an airplane, and means operated in response to said control means for causing the operation of said first means in a manner representative of the lowering of the landing wheels by air pressure applied from the air bottle and for causing the release of said relay, whereby said instruments are telemetrically controlled by said first transmitter to read zero pressure representative of the reduction of the air bottle pressure incident to the operation of the landing wheels operating mechanism.

24. In an aircraft trainer for flight personnel, means for simulating the operation of the engine of an airplane, a source of current, a control conductor, means controlled by said first means for deriving a potential from said source and for applying it to said conductor in simulation of the application of hydraulic pressure to the hydraulic system of said airplane by an engine driven pump, means for deriving a drain potential from said source and for applying it to said conductor representative of the reduction of the pressure in the hydraulic system to zero incident to the failure of said engine driven pump, an instructor's desk, instruments in the cockpit of the trainer and at said desk for indicating the simulated hydraulic pressure in the hydraulic system, a system open key at said desk, and a relay responsive to the operation of said key for disabling said first potential deriving means and for rendering said second potential deriving means effective in simulation of the failure of the engine operated pump.

25. In an aircraft trainer for flight personnel, means for simulating the production of a hydraulic pressure in the hydraulic system of an airplane, a source of current, a control conductor, means controlled by said first means for deriving a potential from said source and for applying it to said conductor in simulation of the application of hydraulic pressure to the hydraulic system of said airplane, means for deriving a drain potential from said source and for applying it to said conductor representative of the reduction of the pressure in the hydraulic system incident to a leak, an instructor's desk, instruments in the cockpit of the trainer and at said desk for indicating the simulated hydraulic pressure in the hydraulic system, a line open key at said desk, and a relay responsive to the operation of said key for disabling said first potential deriving means and for rendering said second potential deriving means effective in simulation of the lowering of the hydraulic pressure due to a leak.

26. In an aircraft trainer for flight personnel, means for simulating the hydraulic hand pump of an airplane, a source of current, a control conductor, means controlled by said first means for deriving a potential from said source and for applying impulses thereof to said conductor in simulation of the application of hydraulic pressure to the hydraulic system of said airplane by said hand pump, means for simulating the control and operation of the hydraulically operated mechanisms of said airplane, means responsive to said latter means for deriving potentials from said source and for applying them to said conductor representative of the reduction of the pressure in the hydraulic system of an airplane incident to the operation of said mechanisms, a motor responsive to the summation of the potentials applied to said conductor, an instructor's desk and instruments in the cockpit of said trainer and at said desk operable by said motor for indicating the instant simulated hydraulic pressure in said system.

27. In an aircraft trainer for flight personnel, means for simulating the hydraulic hand pump of an airplane, two slow-to-release relays operable respectively upon the up and down stroke of the handle of said pump, a source of current, a control conductor, a relay jointly controlled by said two relays and operable upon each operation thereof to derive a potential from said source and to apply it to said conductor in simulation of the application of hydraulic pressure to the hydraulic system of said airplane by said hand pump, means for simulating the control and operation of the hydraulically operated mechanisms of said airplane, means responsive to said latter means for applying them to said conductor representative of the reduction of the pressure in the hydraulic system of an airplane incident to the operation of said mechanisms, a motor responsive to the summation of potentials applied to said conductor, an instructor's desk, and instruments in the cockpit of said trainer and at said desk operable by said motor for indicating the instant simulated hydraulic pressure in said system.

28. In an aircraft trainer for flight personnel, means for simulating the hydraulic hand pump of an airplane, means for simulating the control and operation of the hydraulically operated mechanisms of said airplane, a switch and relays selectively operable thereby for simulating the hand pump selector valve of an airplane which selectively associates the hand pump with hydraulic mechanisms controlled by said pump, a source of current, a control conductor, means jointly controlled by said first means and by the operated one of said relays for deriving a potential from said source and for applying it to said conductor in simulation of the application of hydraulic pressure to the hydraulic mechanism selected for operation by the hand pump, a motor responsive to the potential applied to said conductor, an instructor's desk, and instruments in the cockpit of said trainer and at said desk operable by said motor for indicating the instant simulated hydraulic pressure.

29. In an aircraft trainer for flight personnel, means for simulating the hydraulic hand pump of an airplane, means for simulating the hydraulically operated mechanism for raising and lowering the wing flaps of an airplane, a switch and relays selectively operable thereby for simulating the hand pump selector valve of an airplane which selectively associates the hand pump with the hydraulic mechanisms to be controlled by said pump, a source of current, a control conductor, means jointly controlled by said first means and by the relay selectively operated by said switch in simulation of the selection of the wing flaps operating mechanism for deriving a potential from said source and for applying it to said conductor in simulation of the application of hydraulic pressure to the selected mechanism, means responsive to the means for simulating the raising and lowering of the wing flaps for deriving a drain potential from said source for application to said conductor in simulation of the reduction of the pressure incident to raising and lowering of the wing flaps, means responsive to the operation of said hand pump for preventing the application of said drain potential to said conductor, a motor responsive to the potential applied to said conductor, an instructor's desk, and instruments in the cockpit of said trainer and at said desk for indicating the instant simulated hydraulic pressure.

30. In an aircraft trainer for flight personnel, means for simulating the hydraulic hand pump of an airplane, means for simulating the hydraulically operated mechanism for raising and lowering the wing flaps of an airplane, a switch and relays selectively operable thereby for simulating the hand pump selector valve of an airplane which selectively associates the hand pump with the hydraulic mechanisms to be controlled by said pump, a source of current, a control conductor, means jointly controlled by said first means and by the relay selectively operated by said switch in simulation of the selection of the wing flaps operating mechanism for deriving a potential from said source and for applying it to said conductor in simulation of the application of hydraulic pressure to the selected mechanism, a motor responsive to the potential applied to said conductor, a shaft driven by said motor, a relay for discontinuing the application of said potential to said conductor, and a cam operated switch operable by said shaft to cause the operation of said relay when said shaft has been rotated to a position representative of the minimum pressure required to operate the wing flaps mechanism when the simulated flight is still on the ground.

31. In an aircraft trainer for flight personnel, means for simulating the hydraulic hand pump of an airplane, means for simulating the hydraulically operated mechanism for raising and lowering the wing flaps of an airplane, a switch and relays selectively operable thereby for simulating the hand pump selector valve of an airplane which selectively associates the hand pump with the hydraulic mechanisms to be controlled by said pump, a source of current, a control conductor, means for simulating the air speed of a simulated flight, a relay operated by said air speed simulating means when an airborne flight is being simulated, means jointly controlled by said first means by the relay selectively operated by said switch in simulation of the selection of the wing flaps operating mechanism and by said latter relay for deriving a potential from said source and for applying it to said conductor in simulation of the application of hydraulic pressure to the selected mechanism, a motor responsive to the potential applied to said conductor, a shaft driven by said motor, a relay for discontinuing the application of said potential to said conductor, and a cam operated switch operable by said shaft to cause the operation of said latter relay when said shaft has been rotated to a position representative of the minimum pressure required to operate the wing flaps mechanism when the simulated flight is airborne.

32. In an aircraft trainer for flight personnel, means for simulating the hydraulic hand pump of an airplane, means for simulating the hydraulically operated mechanism for retracting and lowering the landing wheels of an airplane, a switch and relays selectively operable thereby for simulating the hand pump selector valve of an airplane which selectively associates the hand pump with the hydraulic mechanisms to be controlled by such pump, a source of current, a control conductor, means jointly controlled by said first means and by the relay selectively operated by said switch in simulation of the selection of the landing wheels operating mechanism for deriving a potential from said source and for applying it to said conductor in simulation of the application of hydraulic pressure to the selected mechanism, a motor responsive to the potential applied to said conductor, a shaft driven by said motor, a relay for discontinuing the application of said potential to said conductor, and a cam operated switch operable by said shaft to cause the operation of said relay when said shaft has been rotated to a position representative of the minimum pressure required to operate the landing wheels mechanism.

33. In an aircraft trainer for flight personnel, means for simulating the hydraulic hand pump of an airplane, means for simulating the hydraulically operated mechanism for opening and closing the engine cowl flaps of an airplane, a switch and relays selectively operable thereby for simulating the hand pump selector valve of an airplane which selectively associates the hand pump with the hydraulic mechanisms to be controlled by such pump, a source of current, a control conductor, means jointly controlled by said first means and by the relay selectively operated by said switch in simulation of the selection of the cowl flaps operating mechanism for deriving a potential from said source and for applying it to said conductor in simulation of the application of hydraulic pressure to the selected mechanism, a motor responsive to the potential applied to said conductor, a shaft driven by said motor, a relay for rendering said cowl flaps simulating means ineffective, and a cam operated switch operable by said shaft to cause the operation of said relay until said shaft has been rotated to a position representative of the minimum pressure required to operate the cowl flaps mechanism.

34. In an aircraft trainer for flight personnel, means for simulating the hydraulic hand pump of an airplane, means for simulating the hydraulically operated mechanism for opening and closing the engine cowl flaps of an airplane, a switch and relays selectively operable thereby for simulating the hand pump selector valve of an airplane which selectively associates the hand pump with the hydraulic mechanisms to be controlled by said pump, a source of current, a control conductor, means jointly controlled by said first means and by the relay selectively operated by said switch in simulation of the selection of the cowl flaps operating mechanism for deriving a potential from said source and for applying it to said conductor in simulation of the application of hydraulic pressure to the selected mechanism, a motor responsive to the potential applied to said conductor, a shaft rotatable by said motor, a relay releasable to render said cowl flaps simulating means operative when said shaft has been rotated to a position representative of a pressure adequate to operate the cowl flaps mechanism, and means operative subsequent to the release of said latter relay for rendering said cowl flaps simulating means inoperative upon each operation of the hand pump simulating means whereby the step-by-step operation of the cowl flaps under hand pump operation is simulated.

FRANK M. PEARSALL.

REFERENCES CITED

The following references are of record in the file of this patent:

UNITED STATES PATENTS

| Number | Name | Date |
| --- | --- | --- |
| 1,655,244 | Rowell | Jan. 3, 1928 |
| 2,099,857 | Link | Nov. 23, 1937 |
| 2,164,412 | Koster | July 4, 1939 |
| 2,218,546 | Muller | Oct. 22, 1940 |
| 2,327,997 | Carmody | Aug. 31, 1943 |
| 2,346,838 | Haight | Apr. 18, 1944 |
| 2,366,603 | Dehmel | Jan. 2, 1945 |
| 2,372,741 | Roberts | Apr. 3, 1945 |
| 2,373,313 | Jeandron | Apr. 10, 1945 |
| 2,395,477 | Gumley | Feb. 26, 1946 |
| 2,406,221 | Hornfeck | Aug. 20, 1946 |
| 2,428,767 | Albert | Oct. 14, 1947 |